(12) United States Patent
Kwon et al.

(10) Patent No.: US 7,843,791 B2
(45) Date of Patent: Nov. 30, 2010

(54) OPTICAL INFORMATION PROCESSING METHOD AND OPTICAL INFORMATION REPRODUCING METHOD USING MULTIPLEXING SCHEMES CAPABLE OF IMPROVING A DENSITY OF RECORDED OPTICAL INFORMATION

(75) Inventors: Yun-Young Kwon, Goyang-si (KR); Kun-Yul Kim, Gunpo-si (KR)

(73) Assignee: Daewoo Electronics Corp., Seoul (KR)

( * ) Notice: Subject to any disclaimer, the term of this patent is extended or adjusted under 35 U.S.C. 154(b) by 881 days.

(21) Appl. No.: 11/687,932

(22) Filed: Mar. 19, 2007

(65) Prior Publication Data
US 2008/0106996 A1  May 8, 2008

(30) Foreign Application Priority Data
Nov. 8, 2006 (KR) ............... 10-2006-0109946
Nov. 8, 2006 (KR) ............... 10-2006-0109947

(51) Int. Cl.
*G11B 7/00* (2006.01)
(52) U.S. Cl. ................................. 369/103
(58) Field of Classification Search ............ 369/103
See application file for complete search history.

(56) References Cited

U.S. PATENT DOCUMENTS

| | | | |
|---|---|---|---|
| 5,483,365 A | | 1/1996 | Pu et al. |
| 7,167,286 B2 * | | 1/2007 | Anderson et al. ............ 359/25 |
| 7,362,687 B2 * | | 4/2008 | Tsukagoshi ............... 369/103 |
| 7,518,972 B2 * | | 4/2009 | Tsukagoshi et al. ......... 369/103 |
| 7,589,877 B2 * | | 9/2009 | Anderson et al. ............ 359/24 |
| 7,633,660 B2 * | | 12/2009 | Toishi ...................... 359/24 |
| 2005/0078590 A1 | | 4/2005 | Sakane et al. |

FOREIGN PATENT DOCUMENTS

| | | |
|---|---|---|
| CN | 1653395 | 8/2005 |
| CN | 1707639 | 12/2005 |
| EP | 1162520 A1 | 12/2001 |
| EP | 1679699 A1 | 7/2006 |

OTHER PUBLICATIONS

European Search Report for Application No. EP07005401, mailed May 15, 2008.

* cited by examiner

*Primary Examiner*—Wayne R Young
*Assistant Examiner*—Latanya Bibbins
(74) *Attorney, Agent, or Firm*—Revolution IP, PLLC

(57) ABSTRACT

Provided are optical information processing apparatus and method. In the optical information processing apparatus and method, when the recording regions in which optical information is recorded in an angular multiplexing scheme overlap with each other, a recording angle and a recording position for optical information is adjusted so as to improve reproducing efficiency of readout beams reproduced from the overlap recording regions, so that heights of "null" for diffraction energy reproduced from the recording regions and overlap recording regions can be lowered. Accordingly, it is possible to reduce crosstalk noise during the recording and producing of the optical information and to improve optical information recording quality and reproducing efficiency.

6 Claims, 18 Drawing Sheets

OPTICAL INFORMATION PROCESSING METHOD AND OPTICAL INFORMATION REPRODUCING METHOD USING MULTIPLEXING SCHEMES CAPABLE OF IMPROVING A DENSITY OF RECORDED OPTICAL INFORMATION

BACKGROUND

1. Technical Field

The present invention relates to an optical information processing apparatus and an optical information processing method, and more particularly, to an optical information processing apparatus and an optical information processing method of processing optical information by using two or more multiplexing recording methods.

2. Related Art

As an example of an optical data processing apparatus, a holographic optical information processing apparatus records interference fringe formed by intersection of two beams in a storage medium. The interference fringe is a kind of recording data. One of the two beams is an optical modulated signal beam, and the other is a reference beam having the same wavelength as that of the signal beam. The holographic optical information processing apparatus reproduces the data by irradiating the reference beam to the interference fringe formed on the storage medium and detecting a readout beam generated by diffraction of the interference fringe.

The holographic optical information processing apparatus may use various multiplexing methods in order to increase recording capacity thereof.

As examples of the multiplexing methods, there are an angular multiplexing method, a phase-code multiplexing method, a wavelength multiplexing method, a shift multiplexing method, a peristrophic multiplexing method, a correlation multiplexing method, a fractal multiplexing method, and the like.

In addition, there are techniques using a combination of two or more multiplexing methods. As an example of the techniques using a combination of the multiplexing methods, there is a polytopic multiplexing method.

For example, a polytopic multiplexing method is disclosed in U.S. Pat. No. 7,092,133, titled "Polytopic multiplex holography" issued to Kenneth, et al. In addition, a polytopic multiplexing method is disclosed in an article, titled "Polytopic multiplexing" by Anderson, Ken; Curtis, Kevin (Optics letters, Volume 29, Issue 12, pp. 1402-1404, June, 2004).

In the polytopic multiplexing method proposed by Kenneth, et al., adjacent hologram stacks on a storage medium are subject to a partial spatial overlapping process so to multiplexing-recording optical information on the hologram stacks. In the proposed multiplexing method, it is disclosed that the optical information may be multiplexing-recorded on the hologram stacks by using any one of angular, wavelength, phase code, peristrophic, correlation and fractal multiplexing methods.

On the other hand, if diffraction efficiency of holograms which are overlapped and recorded by using a multiplexing method is not uniform, optical information reproducing efficiency may deteriorates. Therefore, the holograms which are recorded in a storage medium by using the multiplexing method requires for good and uniform diffraction efficiency at the time of reproducing of the holograms. However, in most of conventional multiplexing methods for multiplexing recording holograms, only the solution for increasing a recording density is proposed, but the diffraction efficiency at the time of reproducing of the holograms is not taken into consideration.

SUMMARY

The present invention provides an optical information processing apparatus and method of recording overlapped optical information in a storage medium by using a plurality of multiplexing schemes capable of improving a density of recorded optical information.

According to an aspect of the present invention, there is provided an optical information processing apparatus comprising: an optical modulator which modulates a beam propagating to a storage medium into a signal beam; a reference-beam optical system which allows a reference beam to be incident to the storage medium through a path different from a path of the signal beam; and an incidence angle adjustor which adjusts incidence angles of the signal beam and the reference beam incident to the storage medium.

According to another aspect of the present invention, there is provided an optical information processing apparatus comprising: an optical modulator which modulates a beam propagating to a storage medium into a signal beam; a reference-beam optical system which allows reference beams to be incident to the storage medium through a path different from a path of the signal beam; and an incidence angle adjustor which allows the reference beams to be incident at angles in a first incidence angle range when the signal beam is repeatedly incident to one position and allows the reference beams to be incident at angles in a second incidence angle range different from the first incidence angle range when the signal beam is incident to a position partially overlapping with the recording region where is previously formed on the storage medium.

According to still another aspect of the present invention, there is provided an optical information processing apparatus comprising: a reference-beam incidence optical system which allows a reference beam to be incident to a recording region of a storage medium at changed angles in a first incidence angle range and allows the reference beams to be incident to a partial overlap recording region partially overlapping with the recording region of the storage medium at changed angles in a second incidence angle range different from the first incidence angle range; and a readout beam detector which detects a readout beam reproduced from the storage medium.

According to further still another aspect of the present invention, there is provided an optical information processing method comprising steps of: allowing a first signal beam to be incident to a storage medium; allowing a first reference beam adjusted in a first incidence angle range together with the first signal beam to be incident to a position of the storage medium where the first signal beam is incident to form a recording region; allowing the second signal beam to be incident to partially overlap with recording region; allowing a second reference beam adjusted in a second incidence angle range different from the first incidence angle range together with the second signal beam to be incident to a position of the storage medium where the second signal beam is incident to form a partial overlap recording medium.

According to yet another aspect of the present invention, there is provided an optical information processing method comprising steps of: overlapping and recording optical information on a recording region of a storage medium by allowing a beam to be incident at multiplexed angles in a first incidence angle range; partially overlapping and recording optical information on the recording region of the storage medium by allowing a beam to be incident at multiple angles in a second incidence angle range different from the first incidence angle range; allowing a reference beam for reproducing the optical information from the recording medium to be incident to the recording region at the angle in the first incidence angle range; and allowing the reference beam for reproducing the optical information from the partial overlap recording region to be incident to the partial overlap recording region at the angle in the second incidence angle region; performing beam detecting.

According to still yet another aspect of the present invention, there is provided an optical information recording method comprising steps of: forming a plurality of recording regions by allowing a first signal beams and a first reference beam having multiple incidence angles for one position to be incident to a plurality of positions of a storage medium; allowing the first reference beam to be incident to the recording region so that an incidence region of the first reference beam overlaps with another incidence region of the first reference beam incident to an adjacent recording region; and forming an overlap recording region by allowing a second signal beam and a second reference beam to be incident to a position where the first reference beams overlap with each other.

According to further still yet another aspect of the present invention, there is provided an optical information reproducing method comprising steps of: allowing a first reference beam to be incident to a recording region of a storage medium at multiple changed incidence angles to reproduce optical information from the recording region; allowing a second reference beam to be incident to an overlap recording region which is formed at a position where border parts of the first reference beams incident to the storage medium for reproducing the recording regions overlap each other to reproduce optical information from the overlap recording region.

According to further still yet another aspect of the present invention, there is provided an optical information recording apparatus comprising: an optical system which allows a reference beam to be incident to a storage medium at multiple changed angles and a signal beam on which optical information is loaded by an optical modulator to be incident to the storage medium; and a storage medium moving member which allows the reference beam and the signal beam to intersect each other for recording at a position of the storage medium and moves the storage medium to perform overlap recording on border parts of the reference beams which are incident to the previous recording position.

According to further still yet another aspect of the present invention, there is provided an optical information reproducing apparatus comprising: an optical system which allows a reference beam to be incident to a storage medium at multiple changed angles; a storage medium moving member which allows the reference beam to be incident to a recording position of the storage medium and moves storage medium to allow the reference beam to be incident to an overlap recording region which is formed in border parts of the reference beams incident to the previous recording position; and an optical information detector which detects a readout beam reproduced from the storage medium.

BRIEF DESCRIPTION OF THE DRAWINGS

The above and other features and advantages of the present invention will become more apparent by describing in detail exemplary embodiments thereof with reference to the attached drawings in which.

DESCRIPTION OF EXEMPLARY EMBODIMENTS

Figure 1:
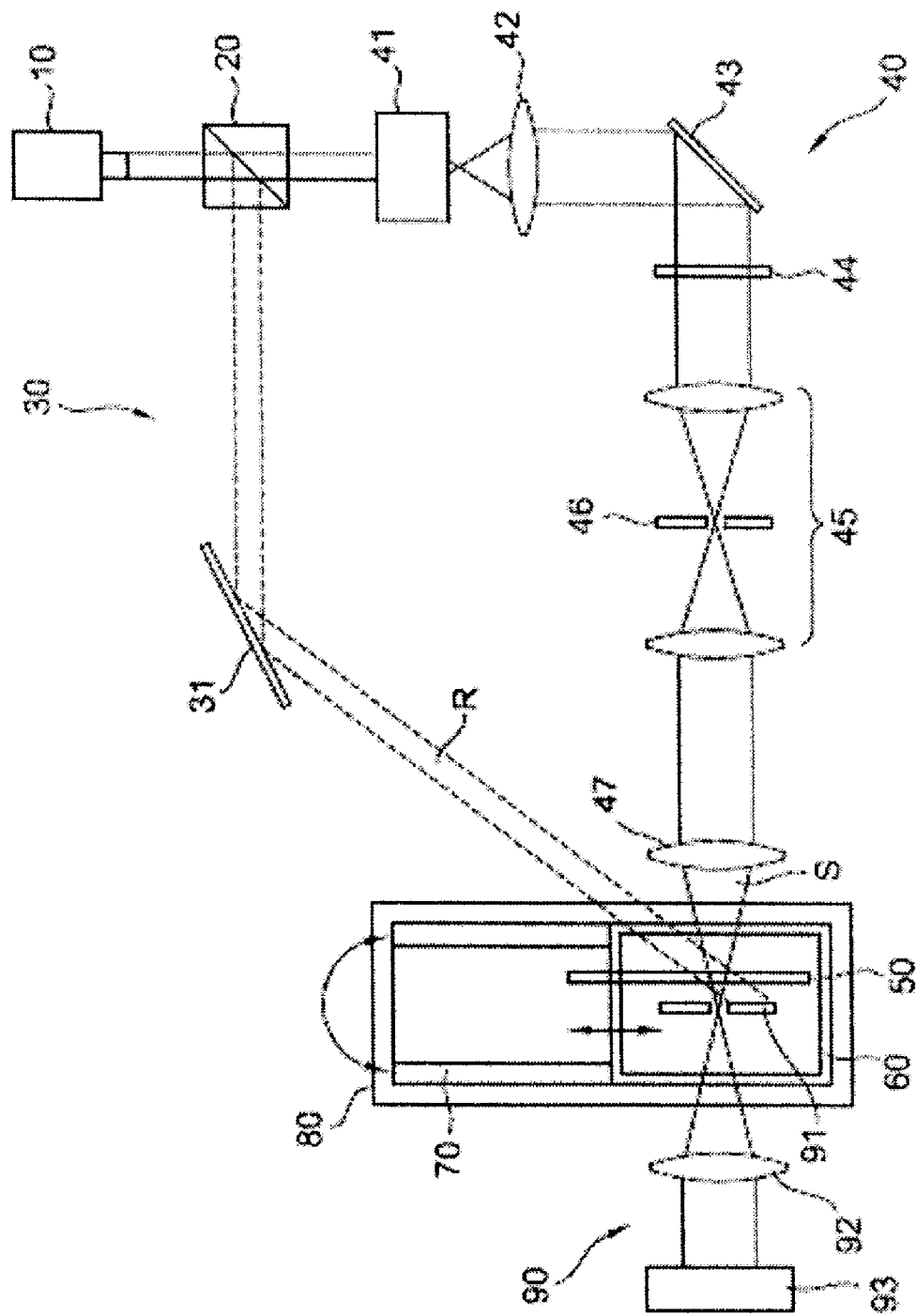
FIG. 1 is a view showing a construction of an optical information processing apparatus according to embodiments of the present invention.

Hereinafter, embodiments of the present invention are described with reference to the accompanying drawings. FIG. 1 is a view showing a construction of an optical information processing apparatus according to embodiments of the present invention.

Referring to FIG. 1, the optical information processing apparatus according to the embodiment of the present invention includes a light source 10, a polarizer beam splitter 20, a signal-beam optical system 40, a reference-beam optical system 30, and a storage medium stage 60.

The light source 10 may be a blue laser having a wavelength of 450 nm to 500 nm, a green laser having a wavelength of 500 nm to 570 nm, or other light sources. The polarizer beam splitter 20 splits light incident from the light source 10 into polarized beams according to polarizing directions. The polarizer beam splitter 20 transmits P-polarized beams and reflects S-polarized beams. The P-polarized beam propagates into the signal-beam optical system 40, and the S-polarized beam propagates into the reference-beam optical system 30.

The reference-beam optical system 30 includes a reflecting mirror 31 which reflects the beam reflected by the polarizer beam splitter 20 into a storage medium 50. The reflecting mirror 31 may be constructed with a rotating mirror serving as an incidence angle adjustor. In addition, the rotating mirror may be constructed with a galvano mirror. The rotating mirror adjusts the incidence angle of the reference beam R and allows the reference beam R having a plurality of the incidence angles to be incident to storage medium 50. Namely, the rotating mirror can perform the angular multiplexing process on the reference beam R.

The signal-beam optical system 40 includes a spatial filter 41 which removes noise from the beam reflected by the polarizer beam splitter 20 and a collimating lens 42 which adjusts the beam from the spatial filter 41 into a parallel beam.

The signal-beam optical system 40 further includes a reflecting mirror 43 disposed after the collimating lens 42, an optical modulator 44, a pair of focusing lenses 45, an aperture interposed between the focusing lenses 45, a Fourier transform lens 47.

The optical modulator 44 may be constructed with a transmissive spatial light modulator such as an LC (liquid crystal) spatial light modulator. Alternatively, the optical modulator 44 may be constructed with a reflective spatial optical modulator such as a DMD (Digital Micro-Mirror Device). The optical modulator 44 modulates data recorded in the storage medium 50 into digital data. Therefore, when a beam is incident to the optical modulator 44, data used for recording is loaded on the beam. As a signal beam S, the beam with the data loaded propagates into the storage medium 50.

The storage medium stage 60 supports the storage medium 50 where optical information is recorded. The storage medium stage 60 is provided with a linear actuator 70 for linearly moving the storage medium 50. In addition, the storage medium stage 60 may be provided with a rotating actuator 80. The rotating actuator 80 has a function as an incidence angle adjustor for performing the angular multiplexing process on the reference beam R and the signal beam S simultaneously.

In addition, the rotating actuator 80 may be constructed to rotate the storage medium stage 60 and the linear actuator 70. In addition, the linear actuator 70 may be constructed to linearly move the storage medium stage 60 and the rotating actuator 80.

The optical information processing apparatus according to the embodiment of the present invention may include a readout-beam optical system 90 for reproducing the optical information recorded in the storage medium 50. The readout-beam optical system 90 includes a filter 91, and inverse Fourier transform lens 92, and an optical information detector 93 which are disposed opposite to a position of the storage medium 50 where the signal beam S and the reference beam R are incident.

The optical information detector 93 may be constructed with a CCD (charge-coupled device) or a CMOS (complementary metal-oxide semiconductor). In case of a recording-dedicated optical information processing apparatus, the readout-beam optical system 90 may not be provided. Similarly, in case of a reproducing-dedicated optical information processing apparatus, the signal-beam optical system 40 may not be provided.

In the aforementioned embodiment, in a case where the reflecting mirror 31 of the reference-beam optical system 30 is constructed with a rotating mirror so as to perform the angular multiplexing process on only the reference beam R, the storage medium stage 60 may be designed not to rotate, or the rotating actuator 80 may not be provided. In a case where the angular multiplexing process is performed on the reference beam S and the signal beam R, the reflecting mirror 31 may be constructed with a fixed-type one.

Now, two embodiments of an optical information processing methods using the optical information processing apparatus having the aforementioned construction are described. The two embodiments may be implemented by using components selected from the components of the aforementioned optical information processing apparatus.

Figure 2:
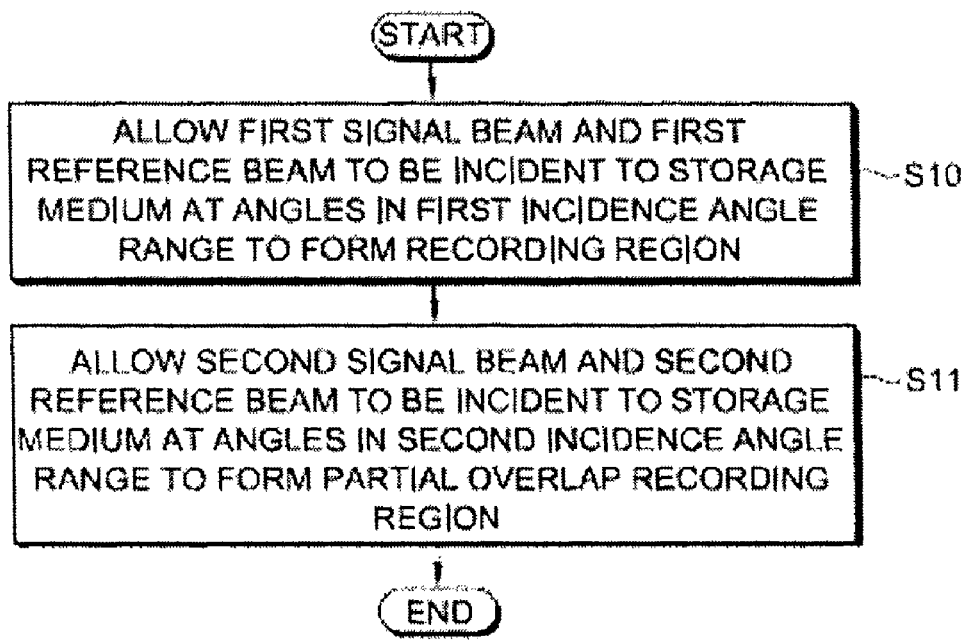
FIG. 2 is a flowchart for explaining an optical information recording method according to a first embodiment of the present invention.

FIG. 2 is a flowchart for explaining an optical information recording method according to a first embodiment of the present invention. As shown in FIG. 2, in the optical information processing method according to the first embodiment of the present invention, a recording region 100 is formed by irradiating a first signal beam S1 and a first reference beam R1 adjusted in a first incidence angle on the storage medium 50 (S10). A plurality of the recording regions 100 are formed as different regions on the storage medium 50 so as not to overlap with each other.

In addition, the recording regions 100 may be sequentially formed to be adjacent to each other in a linear moving direction of the storage medium 50. Alternatively, some recording regions 100 may be firstly formed to be separated from each other, and after that, other recording regions 100 may be secondly formed between the previously-formed recording regions 100 so as not to overlap with the previously-formed recording regions 100. When the recording regions 100 are formed, the first signal beam S1 together with the first reference beam R1 may be adjusted in the first incidence angle range.

After the recording regions 100 are formed, a partial overlap recording region 110 is formed by irradiating a second signal beam S2 and a second reference beam R2 between the recording regions 100 to partially overlap with the recording regions 100 (S11). The first reference beam R1 is adjusted in a second incidence angle range different from the first incidence. Similarly, the second signal beam S2 together with the second reference beam R2 may also be adjusted in the second incidence angle range.

In a case where the only the first reference beam R1 and the second reference beam R2 are subject to angular adjusting, a reflecting mirror for the reference beam R may be constructed with a rotating mirror. In addition, in a case where the first reference beam R1 and the second reference beam R2 together with the first signal beam S1 and the second signal beam S2, respectively, are subject to the angular adjusting, the angular adjusting may be performed by rotating the storage medium stage 60 with the rotating actuator 80.

Figure 3A:
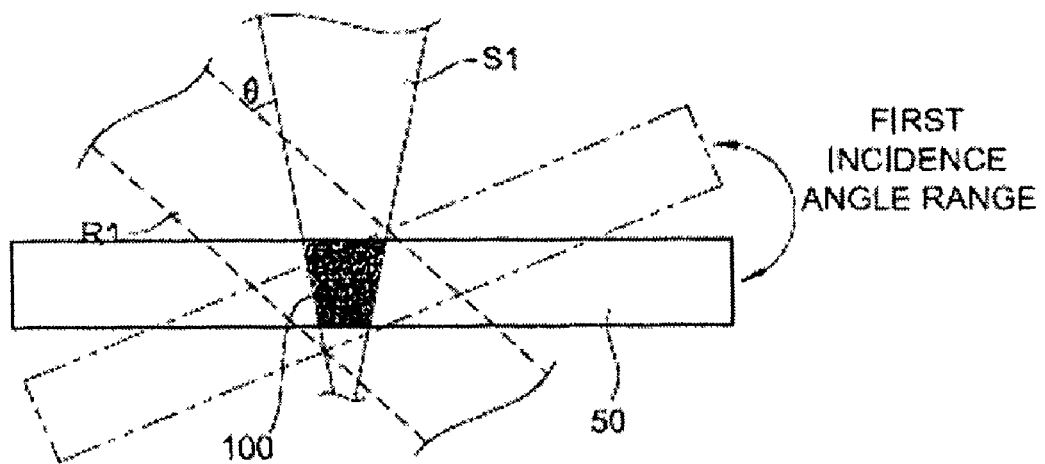
FIGS. 3A and 3B are conceptual views for explaining an angular multiplexing scheme for a reference beam and a signal beam.
Figure 3B:
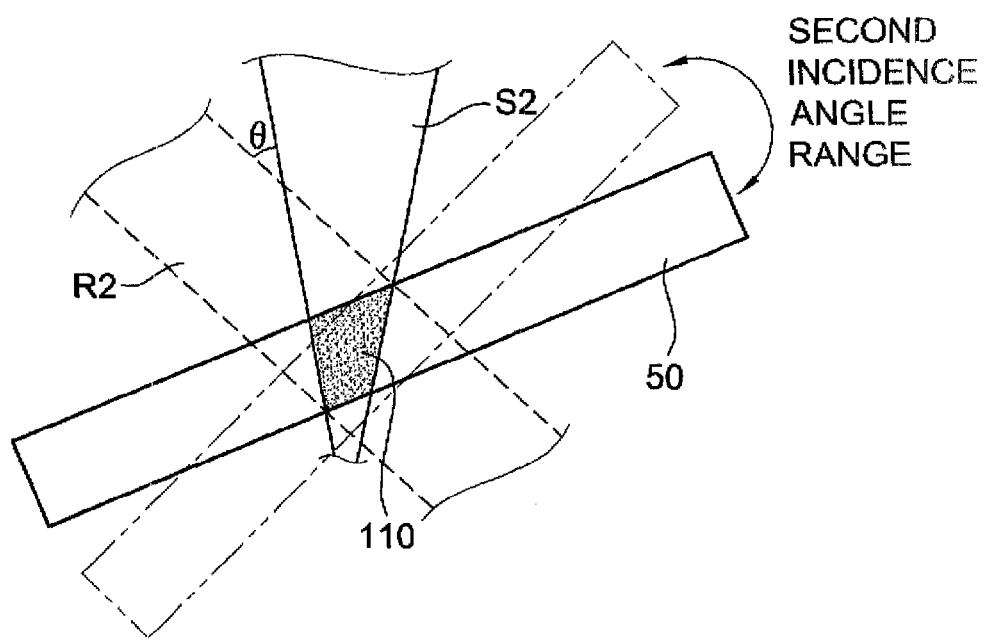

FIGS. 3A and 3B are conceptual views for explaining an angular multiplexing scheme for a reference beam and a signal beam. As shown in FIG. 3A, in order to form the recording regions 100 on the storage medium 50 so as not to overlap with each other, the storage medium 50 is rotated within the first incidence angle range. Due to such a rotation, the first reference beam R1 and the first signal beam S1 are incident to the storage medium 50 at multiplexed angles. The angle between the first reference beam R1 and the first signal beam S1 is maintained constant.

As shown in FIG. 3B, in order to form the partial overlap recording region 110 partially overlapping with the recording regions previously recorded on the storage medium 50, the storage medium 50 is rotated within a second incidence angle range different from the first incidence angle range. Due to such a rotation, the second reference beam R2 and the second signal beam S2 are incident to the storage medium 50 at multiplexed angles in the second incidence angle range. Similarly, the angle between the second reference beam R2 and the second signal beam S2 is maintained constant.

In other words, when the recording regions 100 are formed on the storage medium 50 so as not to overlap with each other, the first reference beam R1 and the first signal beam S1 are multiplexed within the first incidence angle range. After that, when the partial overlap recording regions 110 overlapping with the recording regions 100 are formed, the second reference beam R2 and the second signal beam S2 are multiplexed within the second incidence angle range.

Now, a recording method for the recording region and the partial overlap recording region according to the embodiment of the present invention is described in detail. In the embodiment of the present invention, the recording region 100 may be divided into a first recording region 101 and a second recording region 102.

Figure 4A:
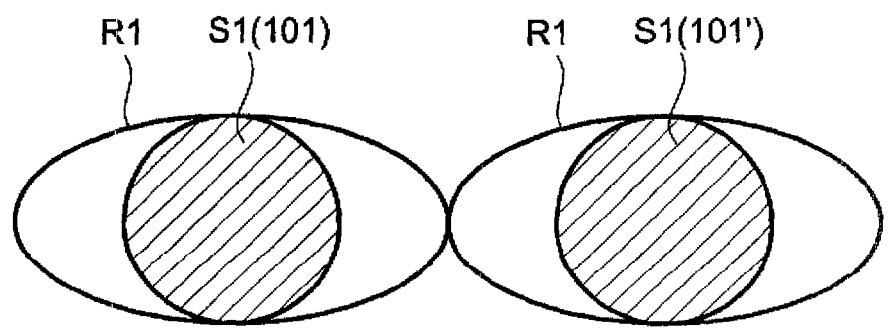
FIG. 4A is a view showing incidence regions of the reference beam and the signal beam in a first recording region in the optical information processing method according to the first embodiment of the present invention.
Figure 4B:
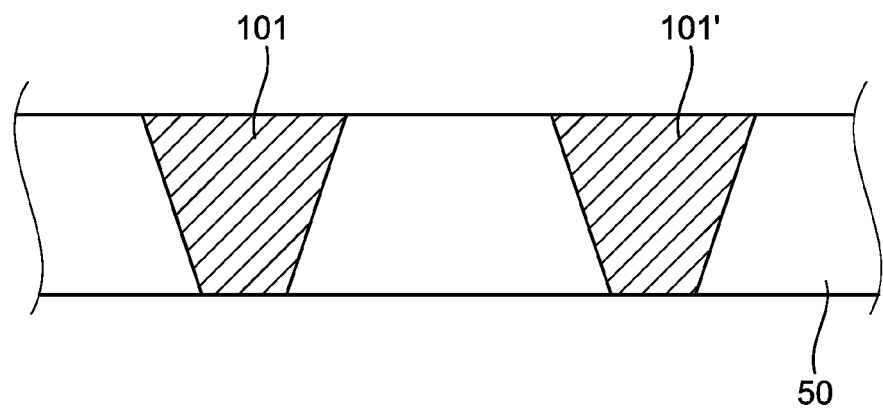
FIG. 4B is a view for explaining the first recording region in the optical information processing method according to the first embodiment of the present invention.

Firstly, a recording method for the first recording region 101 (see FIG. 5B) is described. FIG. 4A is a view showing incidence regions of the reference beam and the signal beam in the first recording region in the optical information processing method according to the first embodiment of the present invention.

As shown in FIG. 4A, the first signal beam S1 is incident to the first recording region 101. The incidence size of the first reference beam R1 is larger than the incidence size of the first signal beam S1. As a result, the first recording region 101 is formed in a region of the storage medium 50 where the first signal beam S1 and the first reference beam R1 interfere with each other. Next, the storage medium 50 is rotated with respect to the first recording region 101 at multiplexed angles in the first incidence angle range. At each angle where the storage medium 50 is rotated, the first signal beam S1 having data different from the previously-recorded data together with the first reference beam R1 is incident, the overlapped optical information is recorded in the first recording region 101. Namely, due to the angular multiplexing scheme, a plurality of overlapped optical information is recorded on a single first recording region 101.

Next, in order to form another first recording region 101, the storage medium 50 is moved by a predetermined distance by using the linear actuator 70. When the storage medium 50 is located at a position where the first recording region 101' is to be formed, the first signal beam S1 having different information is incident to the first recording region 101' to record the optical information.

With respect to the rotation of the storage medium 50 for forming another first recording region 101', the storage medium 50 may be rotated in a direction opposite to the direction of rotation of the storage medium 50 for forming the previous first recording medium in the first incidence angle range. Alternatively, the storage medium 50 may be returned to a position corresponding to the initial angle of the storage medium 50, and after that, the storage medium 50 may be rotated in the same direction of rotation of the storage medium 50 for forming the previous first recording region 101 in the first incidence angle range.

Figure 5A:
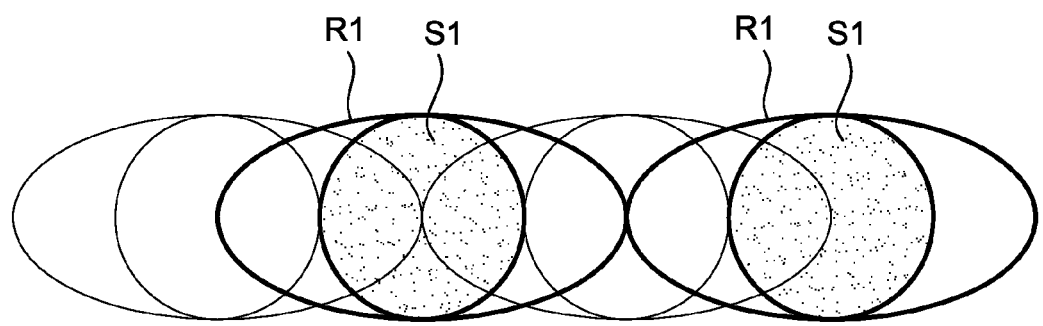
FIG. 5A is a view showing incidence regions of the reference beam and the signal beam in a second recording region in the optical information processing method according to the first embodiment of the present invention.
Figure 5B:
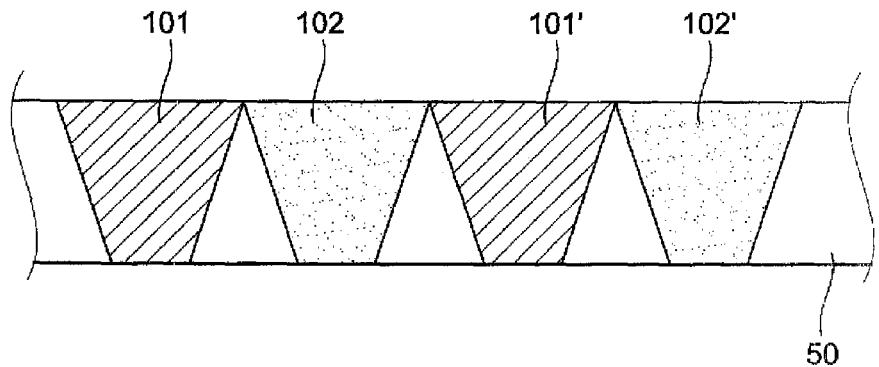
FIG. 5B is a view for explaining the second recording region in the optical information processing method according to the first embodiment of the present invention.

The distance between the previous first recording region 101 and the first recording region 101' may be maintained to be such a distance that the incidence regions of the first reference beams R1 are adjacent to each other but not overlap with each other. Subsequently, the storage medium 50 is linearly moved to form the first recording regions 101 and 101' on the overall storage medium 50. Accordingly, as shown in FIG. 5B, the first recording regions 101 and 101' are recorded in a state that the first recording regions 101 and 101' are separated from each other by a predetermined distance.

Next, a recording method for the second recording region 102 (see FIG. 5B) is described. FIG. 5B is a view for explaining the second recording region in the optical information processing method according to the first embodiment of the present invention.

The second recording region 102 denotes a region between the first recording regions 101 and 101'. In addition, the second recording region 102 is formed not to overlap with the first recording regions 101 and 101'.

Figure 6A:
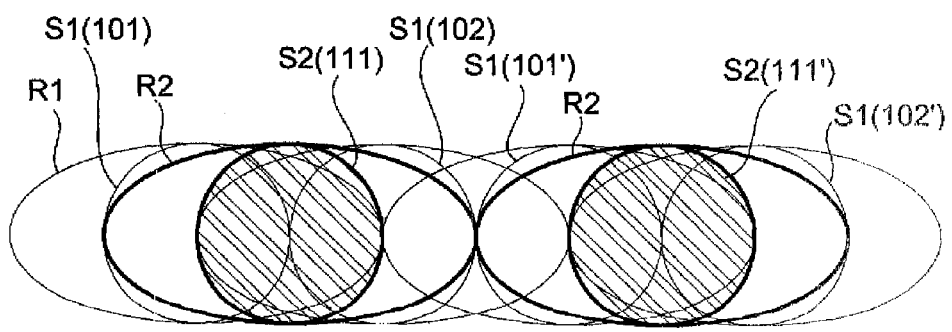
FIG. 6A is a view showing incidence regions of the reference beam and the signal beam in a first partial overlap recording region in the optical information processing method according to the first embodiment of the present invention.

As shown in FIG. 6A, the first signal beam S1 is incident to positions where the second recording region 102 are to be formed. The position of the second recording region 102 is obtained by linearly moving the storage medium 50. The incidence size of the first reference beam R1 is larger than the incidence size of the first signal beam S1. As a result, the second recording region 102 is formed in a region of the storage medium 50 where the first signal beam S1 and the second reference beam R2 interfere with each other. Since the incidence region of the first reference beam R1 is larger than the incidence region of the first signal beam S1, the incidence region of the first reference beam R1 may partially overlap with the first recording region 101.

Next, the storage medium 50 is rotated with respect to the second recording region 102 at multiplexed angles in the same first incidence angle range as the range used for recording the first recording region 101. At each angle where the storage medium 50 is rotated, the first signal beam S1 having data different from the previously-recorded data together with the first reference beam R1 is incident, the overlapped optical information is recorded in the second recording region 102. Namely, due to the angular multiplexing scheme, a plurality of overlapped optical information is recorded on a single second recording region 102.

Next, in order to form another second recording region 102', the storage medium 50 is moved by a predetermined distance by using the linear actuator 70. When the storage medium 50 is located at a position where the second recording region 102' is to be formed, the first signal beam S1 having different information is incident to the second recording region 102' to record the optical information.

The distance between the second recording region 102 and the second recording region 102' may be maintained to be such a distance that the incidence regions of the first reference beams R1 are adjacent to each other but not overlap with each other.

Subsequently, the storage medium 50 is linearly moved to form the second recording regions 102 and 102' on the corresponding positions of the overall storage medium 50. Accordingly, as shown in FIG. 5B, the second recording regions 102 and 102' are recorded in a state that the second recording regions 102 and 102' are separated from each other by a predetermined distance. As a result, the recording regions 100 are recorded in such a pattern that pairs of the first recording regions 101 and the second recording regions 102 are sequentially and repeatedly formed.

Subsequently, the partial overlap recording regions 110 (see FIG. 3B) are formed. In the embodiment of the present invention, the partial overlap recording regions 110 may be divided into a first partial overlap recording region 111 and a second partial overlap recording region 112.

Figure 6B:
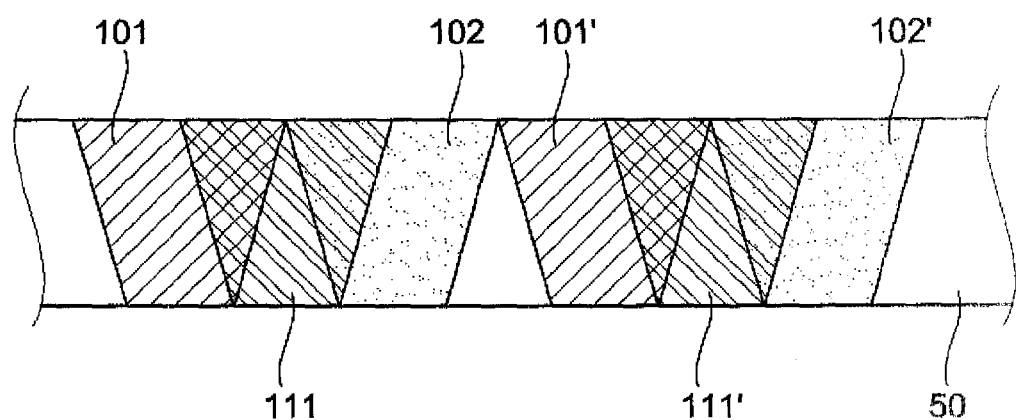
FIG. 6B is a view for explaining the first partial overlap recording region in the optical information processing method according to the first embodiment of the present invention.

Firstly, a recording method for the first partial overlap recording region 111 is described. FIG. 6A is a view showing incidence regions of the reference beam and the signal beam in a first partial overlap recording region in the optical information processing method according to the first embodiment of the present invention. FIG. 6B is a view for explaining the first partial overlap recording region in the optical information processing method according to the first embodiment of the present invention.

As shown in FIG. 6A, the second signal beam S2 is incident to the first partial overlap recording region 111. The first partial overlap recording region 111 is located in a boundary between the first recording region 101 and the second recording region 102 which are adjacent to each other.

Therefore, the left portion of the first partial overlap recording region 111 partially overlap with the first recording region 101, and the right portion thereof partially overlaps with the second recording region 102.

The incidence size of the second reference beam R2 is larger than the incidence size of the second signal beam S2. As a result, the first partial overlap recording region 111 is formed in a region of the storage medium 50 where the second signal beam S2 and the second reference beam R2 interfere with each other. Next, the storage medium 50 is rotated with respect to the first partial overlap recording region 111 at multiplexed angles in a predetermined second incidence angle range. The second incidence angle range is different from the first incidence angle range. For example, if the first incidence angle range is from 0° to 14.7°, the second incidence angle range may be from 16° to 34.7°.

At each angle where the storage medium 50 is rotated in the second incidence angle range, the second signal beam S2 having data different from the previously-recorded data together with the second reference beam R2 is incident, the overlapped optical information is recorded in the first partial overlap recording region 111. A step angle of rotation of the storage medium 50 for the angular multiplexing may be 0.21°. Therefore, multiple overlapped optical information are recorded in each of the first partial overlap recording regions 111 due to the angular multiplexing scheme.

Next, in order to form another first partial overlap recording region 111', the storage medium 50 is moved by a predetermined distance by using the linear actuator 70. When the storage medium is located at a position where the first partial overlap recording region 111' is to be formed, optical information is recorded by using the same recording method as the previous first partial overlap recording region 111.

With respect to the rotation of the storage medium 50 for the multiplexing recording in the first partial overlap recording region 111', the storage medium 50 may be rotated in a direction opposite to the direction of rotation of the storage medium for forming the previous first partial overlap recording region 111 in the second incidence angle range. Alternatively, the storage medium 50 may be returned to a position corresponding to the initial angle of the storage medium 50, and after that, the storage medium may be rotated in the same direction of rotation of the storage medium 50 for forming the previous first partial overlap recording region 111 in the second incidence angle range.

The distance between the previous first partial overlap recording region 111 and the first partial overlap recording region 111' may be maintained to be such a distance that the incidence regions of the second reference beam R2 are adjacent to each other but not overlap with each other. Subsequently, the storage medium 50 is linearly moved to form the first partial overlap recording regions 111 and 111' on the storage medium 50.

Accordingly, as shown in FIG. 6B, the first partial overlap recording regions 111 and 111' are recorded in a state that the first partial overlap recording regions 111 and 111' are separated from each other by a predetermined distance.

Figure 7A:
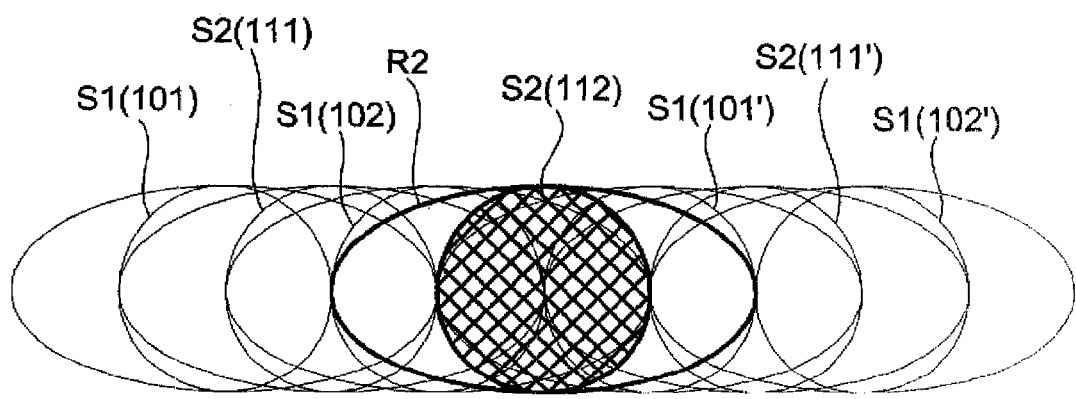
FIG. 7A is a view showing incidence regions of the reference beam and the signal beam in a second partial overlap recording region in the optical information processing method according to the first embodiment of the present invention.
Figure 7B:
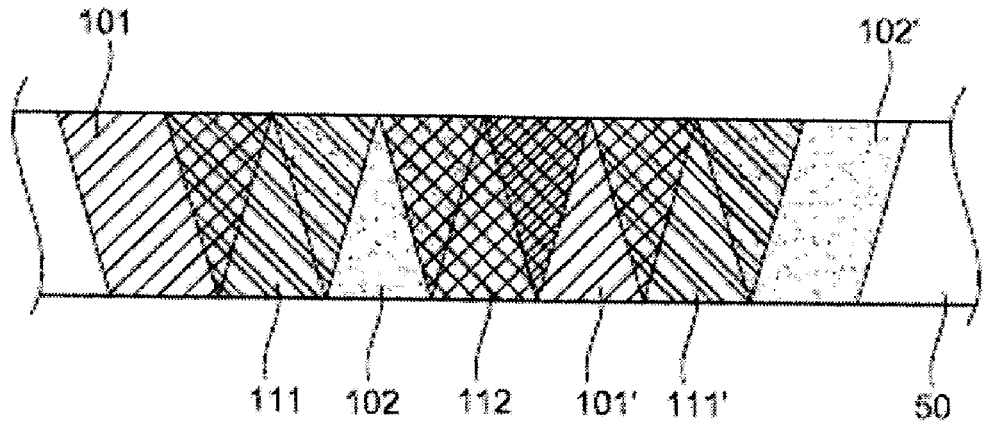
FIG. 7B is a view for explaining the second partial overlap recording region in the optical information processing method according to the first embodiment of the present invention.

Next, a recording method for the second partial overlap recording region 112 is described. FIG. 7A is a view showing incidence regions of the reference beam and the signal beam in a second partial overlap recording region in the optical information processing method according to the first embodiment of the present invention. FIG. 7B is a view for explaining the second partial overlap recording region in the optical information processing method according to the first embodiment of the present invention.

The second partial overlap recording region 112 denotes a region between the first partial overlap recording regions 111.

In addition, the second partial overlap recording region 112 is formed not to overlap with the first partial overlap recording region 111.

As shown in FIG. 7A, the second signal beam S2 is incident to the second partial overlap recording region 112. The position of the second partial overlap recording regions 112 is obtained by linearly moving the storage medium 50. The incidence size of the second reference beam R2 is larger than the incidence size of the second signal beam S2. As a result, the second partial overlap recording region 112 is formed in a region of the storage medium 50 where the second signal beam S2 and the second reference beam R2 interfere with each other. Since the incidence region of the second reference beam R2 is larger than the incidence region of the second signal beam S2, the incidence region of the second reference beam R2 partially overlaps with the first partial overlap recording region 111.

Next, the storage medium 50 is rotated with respect to the second partial overlap recording region 112 at multiplexed angles in the same second incidence angle range as the range for recording the first partial overlap recording region 111. At each angle where the storage medium 50 is rotated, the second signal beam S2 having data different from the previously-recorded data together with the second reference beam R2 is incident, the overlapped optical information is recorded in the second partial overlap recording region 112.

Accordingly, due to the angular multiplexing scheme, a plurality of overlapped optical information is recorded on the second partial overlap recording region 112.

Next, in order to form another second partial overlap recording region, the storage medium 50 is moved by a predetermined distance by using the linear actuator 70.

Next, in order to form another second partial overlap recording region, the storage medium 50 is moved by a predetermined distance by using the linear actuator 70. When the storage medium 50 is located at a position where the another second partial overlap recording region is to be formed, the optical information is recorded by using the same recording method as the recording method for the previous second partial overlap recording region 112.

The distance between the previous second partial overlap recording region 101 and the another second partial overlap recording region 102 may be maintained to be such a distance that the incidence regions of the second reference beams R2 are adjacent to each other but not overlap with other.

Subsequently, the storage medium 50 is linearly moved to form the another second partial overlap recording region on the storage medium 50.

Accordingly, as shown in FIG. 7B, the second partial overlap recording regions 112 are recorded in a state that the second partial overlap recording regions 112 are separated from each other by a predetermined distance. As a result, the recording regions are recorded in such a pattern that pairs of the first partial overlap recording regions 111 and the second partial overlap recording regions 112 are sequentially and repeatedly formed.

Now, an optical information reproducing method of reproducing the optical information from the optical information storage medium where the optical information is recorded by using the aforementioned recording method is described.

Figure 8:
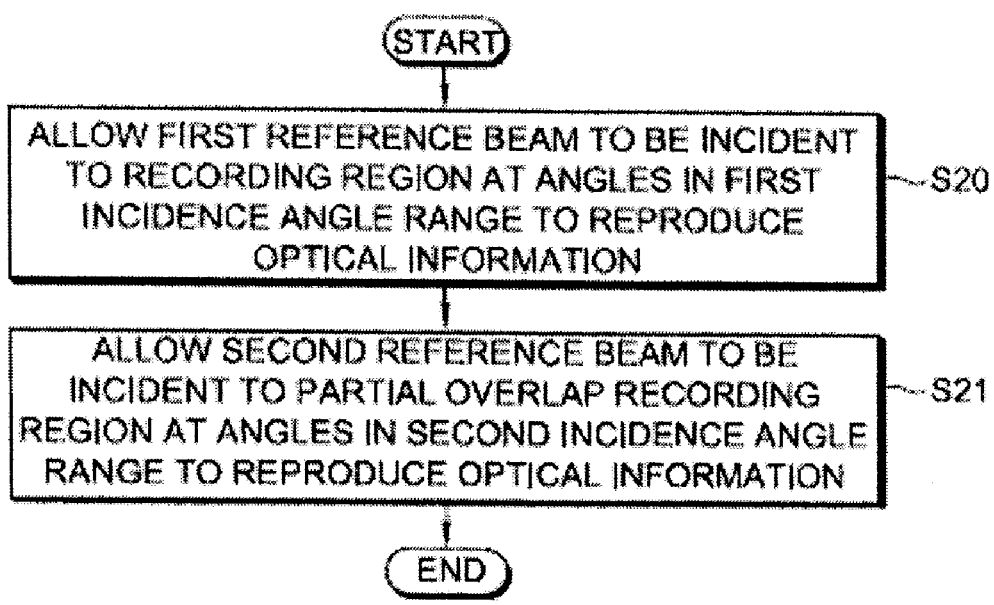
FIG. 8 is a flowchart for explaining an optical information reproducing method according to the first embodiment of the present invention.

FIG. 8 is a flowchart for explaining the optical information reproducing method according to the first embodiment of the present invention. As shown in FIG. 8, in the optical information reproducing method, only the reference beams R1 and R2 are incident to the storage medium 50, and readout beams reproduced from the recording regions of the storage medium 50 are detected with an optical information detector 93.

The first reference beam R1 is incident to the first recording region 101 and the second recording region 102 at changed angles in the first incidence angle range (S20). In addition, the second reference beam R2 is incident to the first partial overlap recording region 111 and the second partial overlap recording region 112 at changed angles in the second incidence angle range (S21). The change in the incidence angles of the reference beams R1 and R2 can be performed by using a rotating mirror or the rotating actuator 80. The linear movement of the storage medium 50 can be performed by using the linear actuator 70.

With respect to the reproducing order for the recording regions 100 and the partial overlap recording regions 110, the recording regions 100 may be firstly reproduced, and after that, the partial overlap recording regions 110 may be reproduced. Alternatively, the partial overlap recording regions 110 may be firstly reproduced, and after that, the recording regions 100 may be reproduced. In addition, with respect to the recording regions 100, the first recording regions 101 may be firstly reproduced, and after that, the second recording regions 102 may be reproduced, or vise versa. In addition, with respect to the partial overlap recording regions 110, the first partial overlap recording regions 111 may be firstly reproduced, and after that, the second partial overlap recording regions 112 may be reproduced, or vise versa. Other reproducing orders may be used.

In the optical information processing method according to the first embodiment of the present invention, the first incidence angle range used for forming the recording region 100 is different from the second incidence angle range used for forming the partial overlap recording region 110. Due to the difference between the incidence angle ranges, recording quality can be improved during the formation of the recording regions 100 or the partial overlap recording regions 110.

Now, an experimental example using the aforementioned optical information processing apparatus and method are described.

FIGS. 9A to 9D are graphs showing diffraction energy measured from a recording region and a partial overlap recording region in which optical information is recorded with an angular multiplexing scheme in a first incidence angle range.

In the experimental example, the first incidence angle range is set to be in a range of 0° to 14.7°, and a step angle is set to 0.21°. Therefore, 71 holograms are overlapped and recorded in each of the recording regions 100 or each of the partial overlap recording regions 110.

Figure 9A:
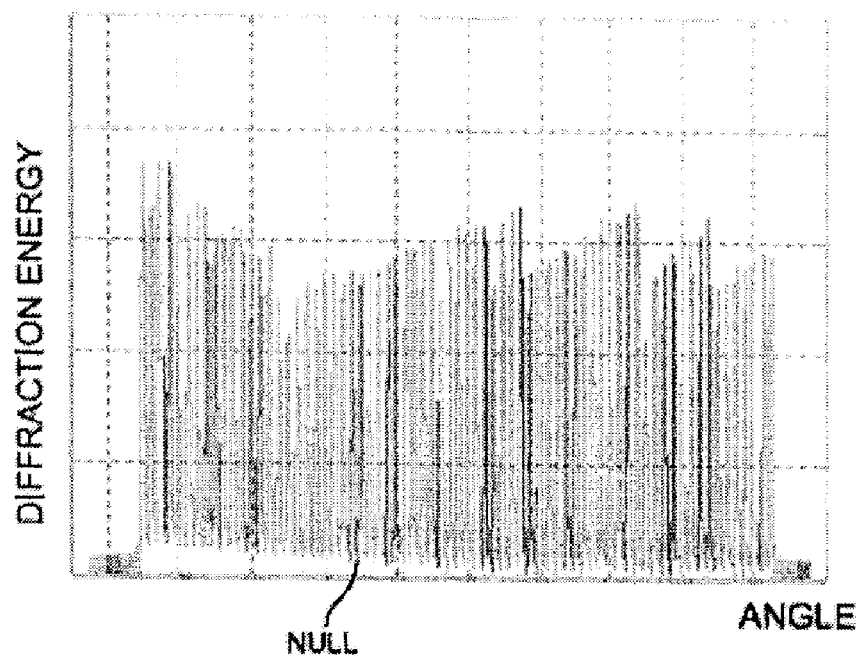
FIGS. 9A to 9D are graphs showing diffraction energy measured from a recording region and a partial overlap recording region in which optical information is recorded with an angular multiplexing scheme in a first incidence angle range.
Figure 9B:
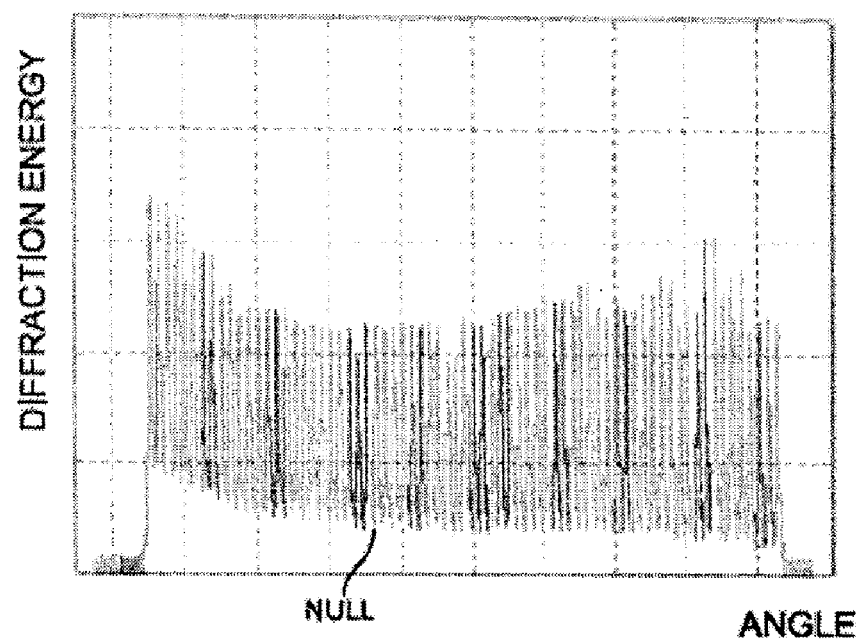
Figure 9C:
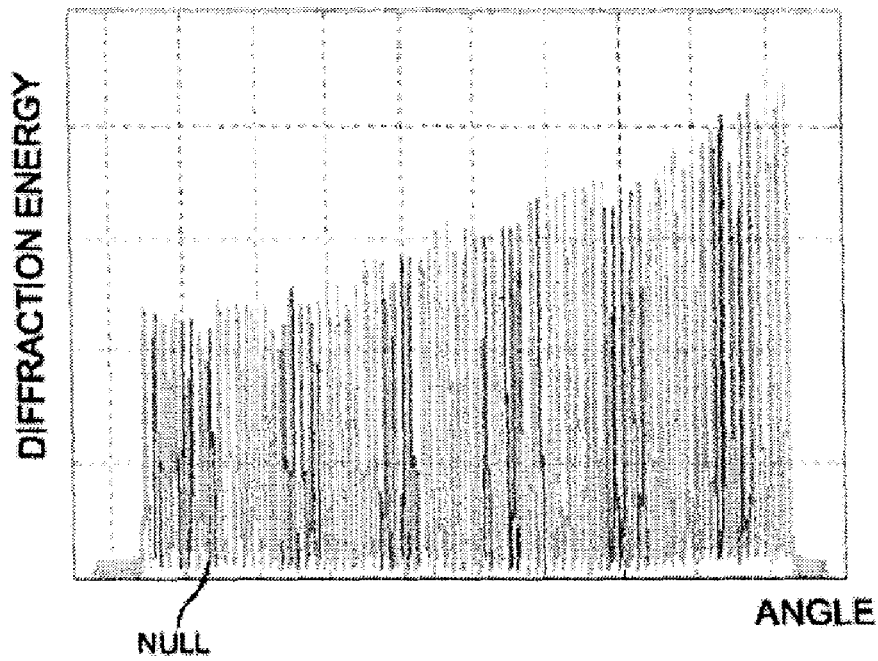
Figure 9D:
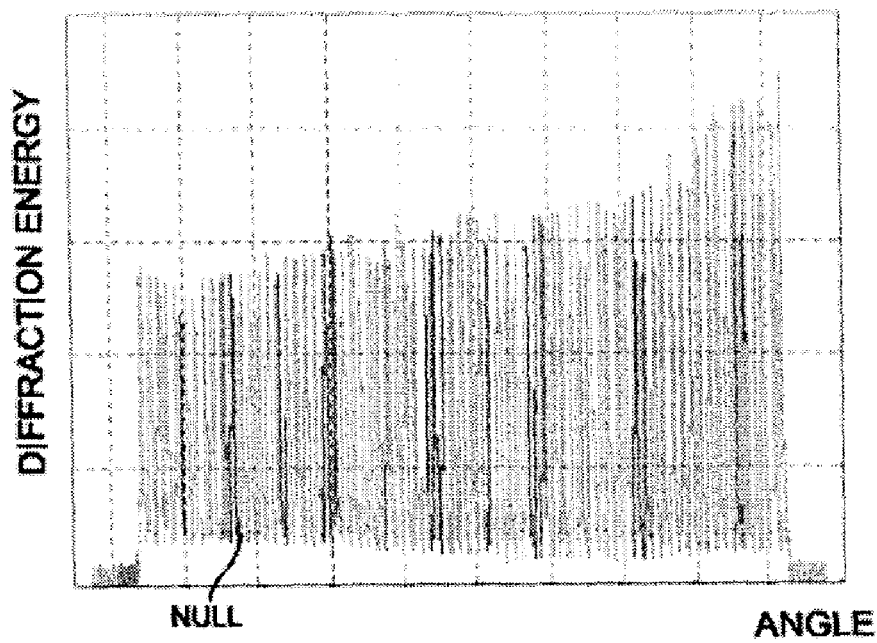

Now, diffraction energy measured from the recording region 100 and partial overlap recording region 110 is described. Referring to FIGS. 9A to 9D, the height of 'null' for the diffraction energy of the first recording region 101 shown in FIG. 9A and the height of 'null' for the diffraction energy of the first partial overlap recording region 111 shown in FIG. 9C are larger than the height of 'null' for the diffraction energy of the second recording region 102 shown in FIG. 9B and the height of 'null' for the diffraction energy of the second partial overlap recording region 112 shown in FIG. 9D.

Namely, the heights of 'null' of the second recording region 102 and the second partial overlap recording region 112 are larger than the heights of 'null' of the first recording region 101 and the first partial overlap recording region 111. The theoretical background is not clarified. In general, the diffraction energy of 'null' generates noise during the reproducing of the optical information. Therefore, it may be understood that the high energy of 'null' generating noise deteriorates a quality of readout data.

Next, a comparative experimental example using the optical information processing apparatus and method according to the embodiment of the present invention is described.

FIGS. 10A to 10D are graphs showing diffraction energy measured from a recording region in which optical information is recorded with an angular multiplexing scheme in a first incidence angle range and diffraction energy measured from a partial overlap recording region in which optical information is recorded with an angular multiplexing scheme in a second incidence angle range.

In the experimental example, for the angular multiplexing of the first recording region 101 and the second recording region 102, the first incidence angle range for the first recording region 101 and the second recording region 102 is set to be in a range of 0° to 14.7°. In addition, the second incidence angle range for the first partial overlap recording region 111 and the second partial overlap recording region 112 is set to be in a range of 16° to 34.7°. A step angle in each of the incidence angle ranges is set to 0.21°. Therefore, 71 holograms are overlapped and recorded in each of the recording regions 100 or each of the partial overlap recording regions 110.

Figure 10A:
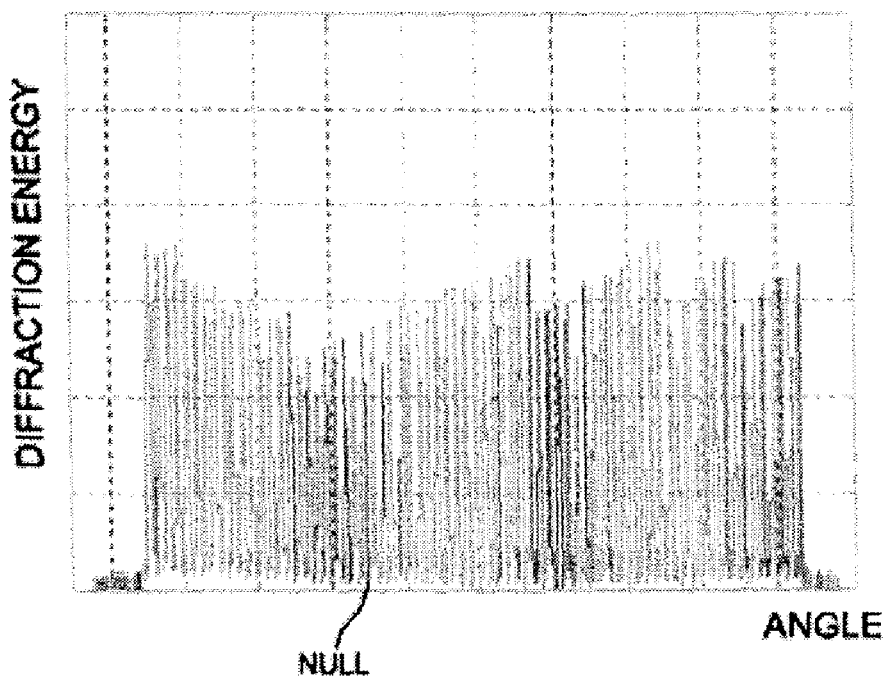
FIGS. 10A to 10D are graphs showing diffraction energy measured from a recording region in which optical information is recorded with an angular multiplexing scheme in a first incidence angle range and diffraction energy measured from a partial overlap recording region in which optical information is recorded with an angular multiplexing scheme in a second incidence angle range.
Figure 10B:
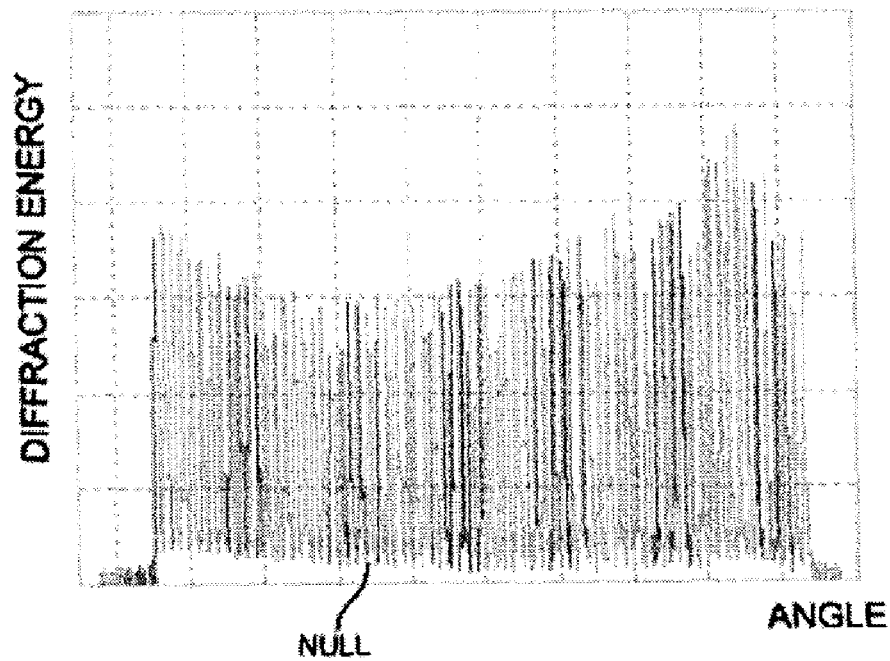
Figure 10C:
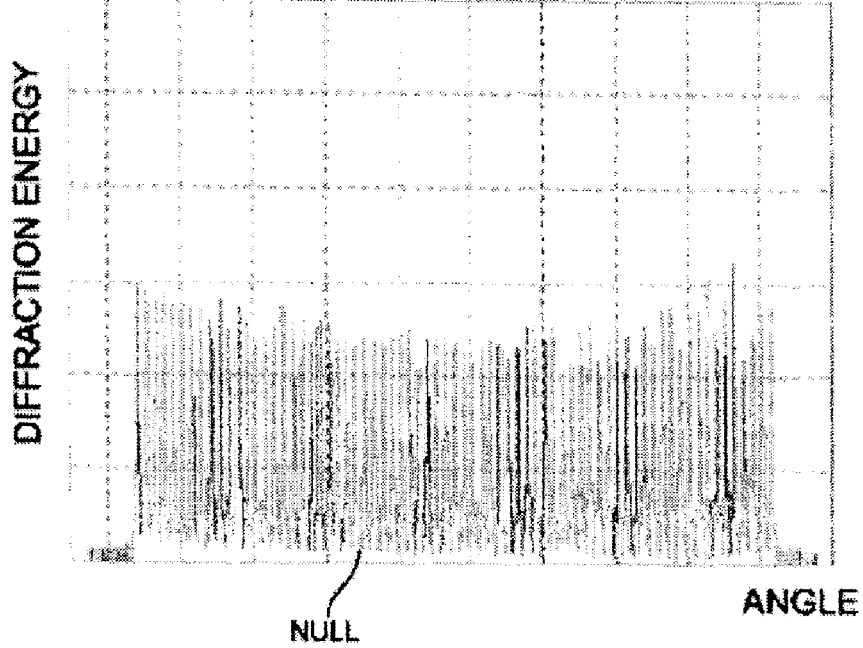
Figure 10D:
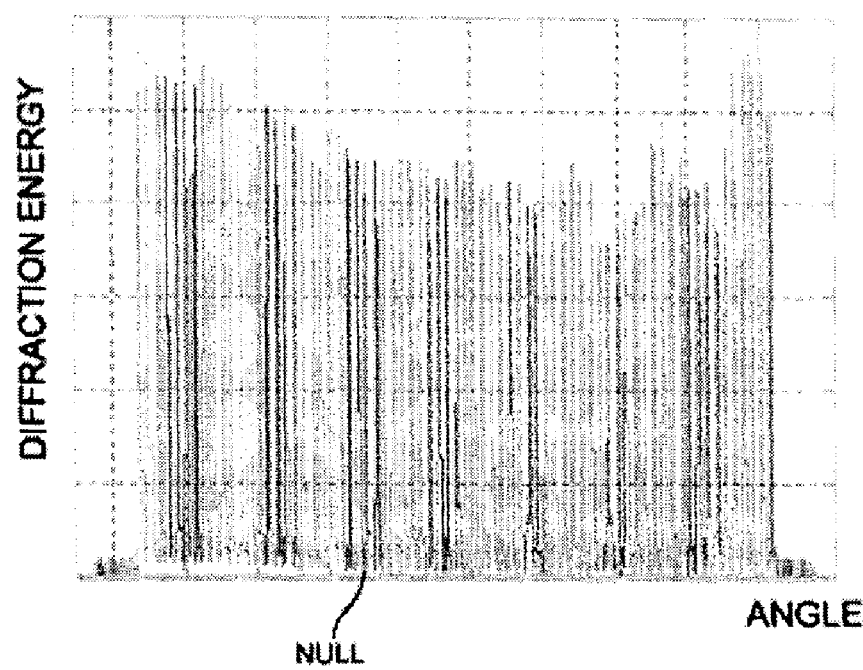

Now, diffraction efficiencies measured from the recording regions 100 and the partial overlap recording regions 110 are described. As shown in FIGS. 10A to 10D, 'null' for the diffraction energy is located at the relatively similar positions over all the recording regions. Moreover, with respect to the second recording region 102 and the second partial overlap recording region 112, the heights of 'null' for the diffraction energy shown in FIG. 10C and FIG. 10D are smaller than the heights of 'null' for the diffraction energy shown in FIGS. 9C and 9D, respectively.

According to the result of the experiment example, it can be understood that crosstalk noise in the overlap recording regions is reduced as the height of 'null' is lowered. Due to the reduction of crosstalk noise, a quality of recorded hologram is improved, and the data reproducing efficiency is also improved.

Now, an optical information processing method according to a second embodiment of the present invention is described.

Figure 11:
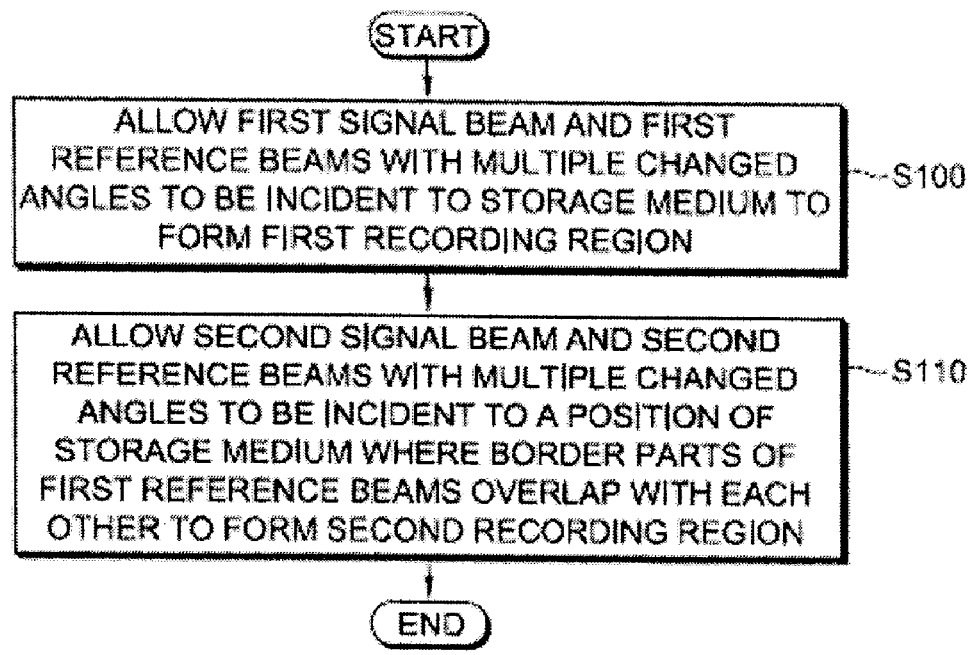
FIG. 11 is a flowchart for explaining an optical information recording method according to a second embodiment of the present invention.

FIG. 11 is a flowchart for explaining the optical information recording method according to a second embodiment of the present invention. As shown in FIG. 11, in the optical information processing method according to the embodiment of the present invention, a first signal beam and a first reference beams at an incidence angle adjusted in an incidence angle range are incident to a storage medium 50 to form a recording region (S100).

Next, the storage medium 50 is moved by using a storage medium moving member 70, and the first signal beam and the first reference beam at an incidence angle adjusted in a predetermined incidence angle range are incident to a region separated from the recording region to form another recording region.

After the recording regions are formed on the storage medium 50, the storage medium 50 is moved, and the second reference beam at an incidence angle adjusted in an incidence angle range together with the second signal beam is incident to form the overlap recording region between the recording regions (S110). The overlap recording region is located at a position where the first reference beams intersect and overlap with each other during the formation of the recording region.

Figure 12A:
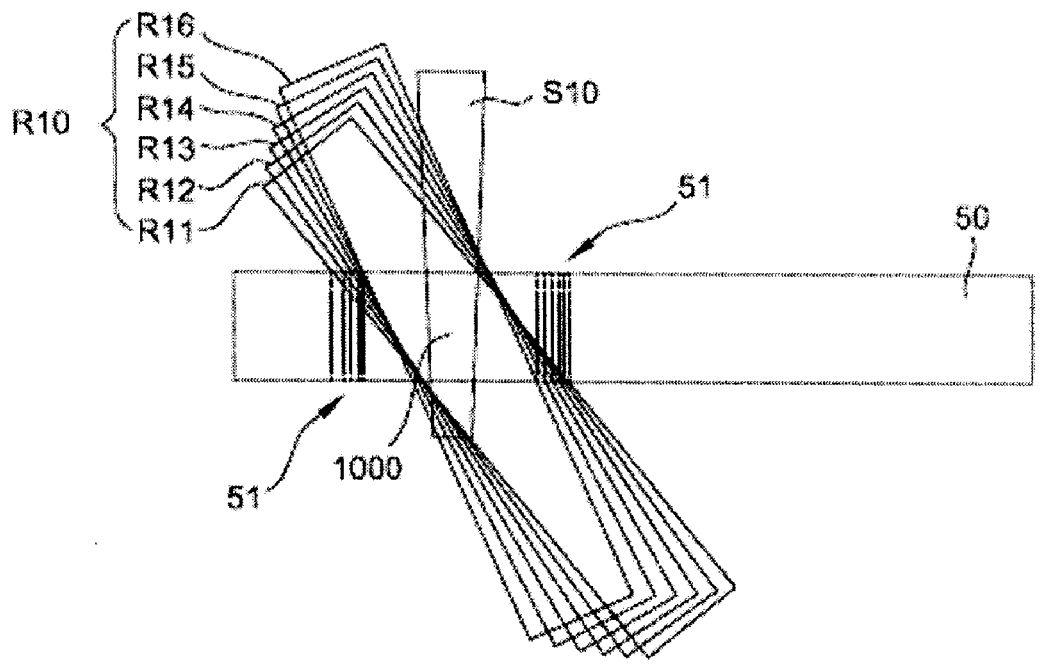
FIG. 12A is a view for explaining states of incidence of a signal beam and a reference beam in the optical information processing method according to the second embodiment of the present invention.
Figure 12B:
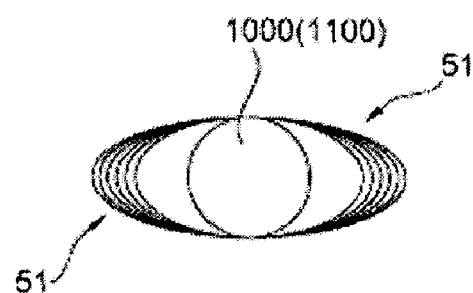
FIG. 12B is a view for explaining incidence regions of the signal beam and the reference beam in the optical information processing method according to the second embodiment of the present invention.

Now, an optical information recording method for a single recording region is described in detail. FIG. 12A is a view for explaining states of incidence of a signal beam and a reference beam in the optical information processing method according to the second embodiment of the present invention. FIG. 12B is a view for explaining incidence regions of the signal beam and the reference beam in the optical information processing method according to the second embodiment of the present invention.

As shown in FIGS. 12A and 12B, in order to form a single recording region 1000, a reference beam R10 is incident to a rotating mirror 31 at multiplexed angles. As the reference beam R10 is slanted with respect to the storage medium 50, the shape of the incidence region of the reference beam R10, that is, each of the reference beams R11 to R16 becomes elliptic.

As the angle between each of the reference beams R11 to R16 and the signal beam S10 becomes larger and larger, the major axis of the ellipse, that is, the incidence region of each of the reference beams R11 to R16 becomes longer and longer. Therefore, when a plurality of the reference beams R11 to R16 are repeatedly incident to one recording region 1000 at multiplexed angles, border parts 51 of the reference beams R11 to R16 are formed in a hierarchical pattern.

Now, an optical information processing method according to the embodiment of the present invention is described in detail.

Figure 13A:
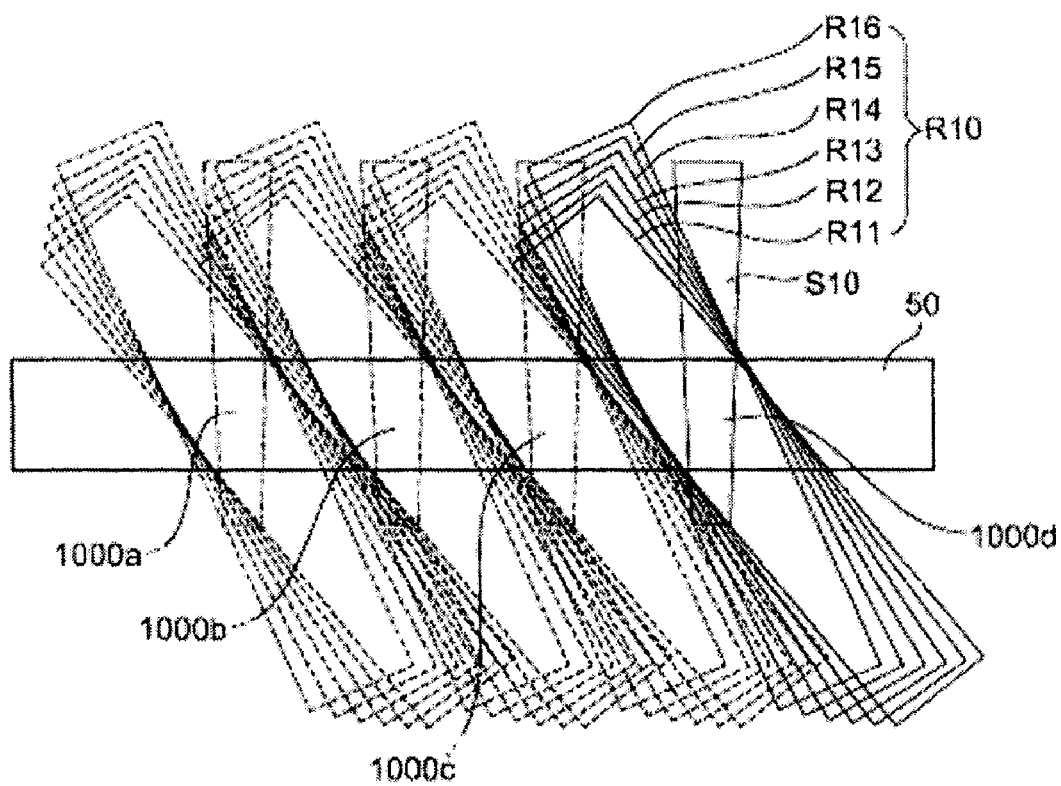
FIG. 13A is a view for explaining states of incidence of a first signal beam and a first reference beam in the optical information processing method according to the second embodiment of the present invention.
Figure 13B:
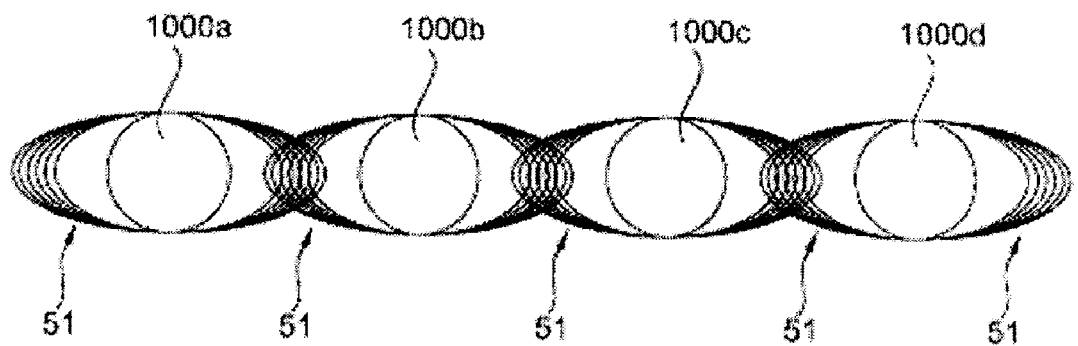
FIG. 13B is a view for explaining incidence regions of the first reference beam in the optical information processing method according to the second embodiment of the present invention.

Firstly, a recording method is described. FIG. 13A is a view for explaining states of incidence of a first signal beam and a first reference beam in the optical information processing method according to the second embodiment of the present invention. FIG. 13B is a view for explaining incidence regions of the first reference beam in the optical information processing method according to the second embodiment of the present invention.

As shown in FIG. 13A, a first signal beam S10 is incident to the storage medium 50 to form a first recording region 1001a. The incidence size of each of the first reference beams R11 to R16 is larger than the incidence size of the first signal beam S10. As a result, the first recording region 1001a is formed in a region of the storage medium 50 where the first signal beam S10 and each of the first reference beams R11 to R16 interfere with each other.

Next, a rotating mirror 31 is rotated with respect to the recording region 1001a at multiplexed angles in a predetermined incidence angle range, so that the first reference beams R11 to R16 are incident with different angles. When each of the first reference beams R11 to R16 is incident, the first signal beam S1 having data different from the previously recorded data is incident. Therefore, due to the angular multiplexing scheme, a plurality of overlapped optical information is recorded on a single recording region 1000a.

Next, in order to form another recording region 1000b, the storage medium 50 is moved by a predetermined distance by using a storage medium moving member 70. When the storage medium 50 is located at a position where the recording region 1000b is to be formed, the first signal beam S10 having different information and the first reference beams R11 to R16 are incident to multiplexing-record optical information. Here, the angular multiplexing scheme is the same as that of the previous recording.

The predetermined distance between the previous recording region 1000a and the recording region 1000b is maintained so that the border parts 51 of the adjacent first reference beams R11 to R16 intersect each other and overlap with each other in the reverse direction. However, the recording regions 1000a and 1000b are maintained at such positions that the recording regions 1000a and 1000b do not overlap with each other.

Figure 14A:
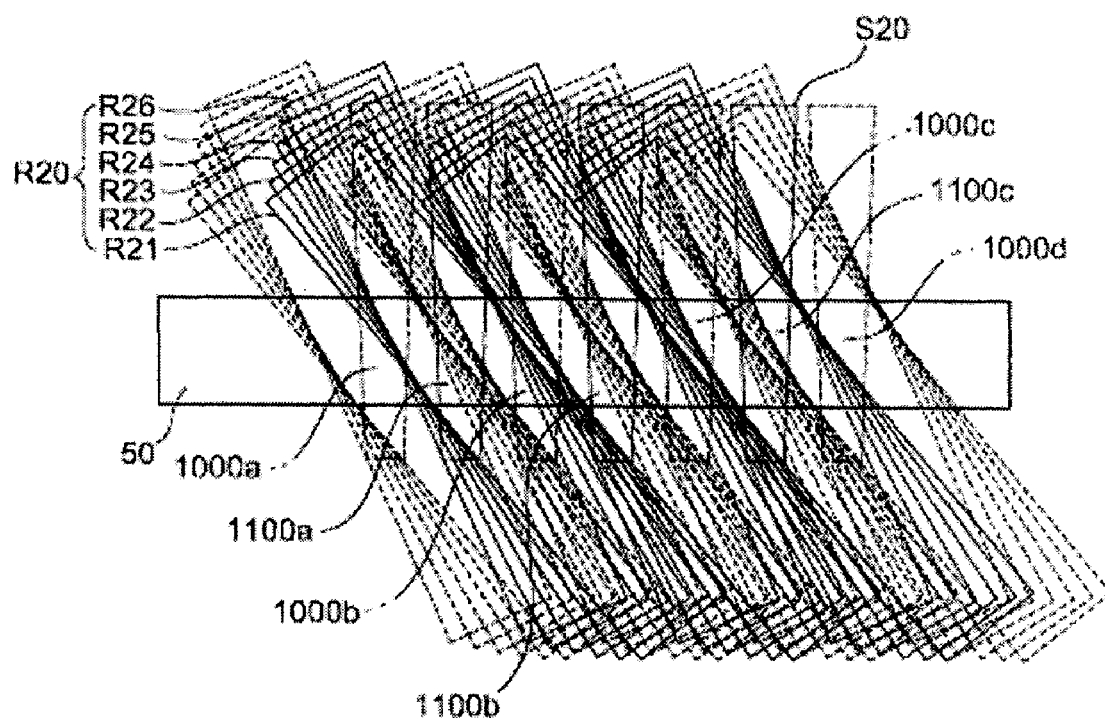
FIG. 14A is a view for explaining states of incidence of a second signal beam and a second reference beam in the optical information processing method according to the second embodiment of the present invention.
Figure 14B:
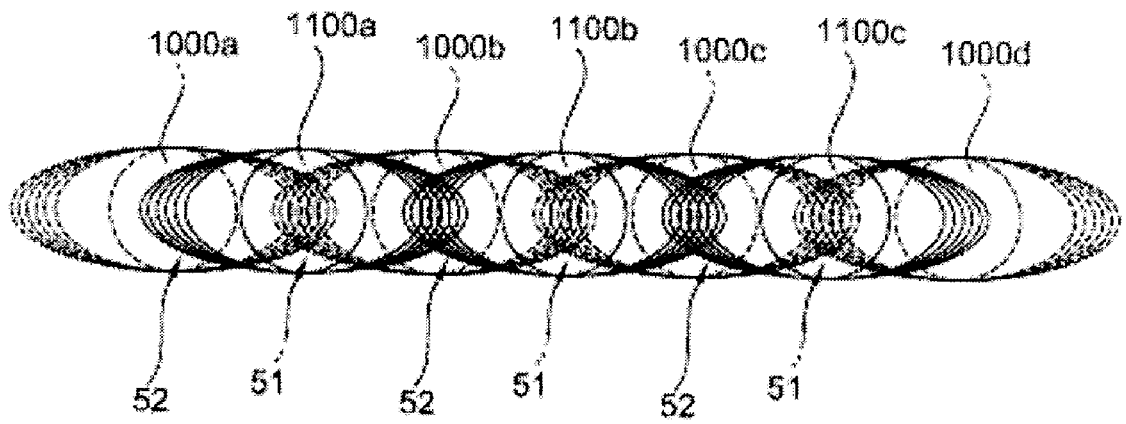
FIG. 14B is a view for explaining incidence regions of the second reference beam in the optical information processing method according to the second embodiment of the present invention.

In such a manner, the storage medium 50 is moved to form the recording regions 1000a to 1000d on the overall the storage medium 50. The number of recording regions 1000a to 1000d is determined based on the area of the storage medium 50. When the recording regions 1000a to 1000d are recorded, the recording regions 1000a to 1000d are separated from each other by a predetermined distance, and only the border parts 51 where the incidence regions of the first reference beams R11 to R16 are formed overlap with each other, as shown in FIG. 13B. Next, a recording method for the overlap recording region is described. FIG. 14A is a view for explaining states of incidence of a second signal beam and a second reference beam in the optical information processing method according to the second embodiment of the present invention. FIG. 14B is a view for explaining incidence regions of the second reference beam in the optical information processing method according to the second embodiment of the present invention.

The overlap recording regions 1100a to 1100c are recording regions between the recording regions 1000a to 1000d. However, the overlap recording regions 1100a to 1100c do not overlap with the recording regions 1000a to 1000d.

As shown in FIG. 14A, a second signal beam S20 having predetermined information is incident to a position where a firstly-recorded overlap recording region 1100a is to be formed. The position of the overlap recording region 1100a is obtained by linearly moving the storage medium 50 by using the storage medium moving member 70. In addition, the position of the overlap recording region 1100a is located in a region where the incidence regions of the first reference beams R11 to R16 (see FIG. 12A, FIG. 13A) overlap with each other during the formation of the recording regions 1000a and 1000b.

The incidence size of the second reference beam R20 is larger than the incidence size of the second signal beam S20. Therefore, the overlap recording region 1100a is formed on the storage medium 50 due to interference between the second signal beam S20 and the second reference beams R21 to R26. Since the incidence region of each of the second reference beams R21 to R26 is larger than the incidence region of the second signal beam S20, the border parts 52 (see FIG. 14B) of the second reference beams R21 to R26 may overlap with the recording region 1000a and 1000b.

The second reference beams R21 to R26 are incident to the overlap recording region 1100a at angles adjusted in a predetermined incidence angle range by a rotating mirror 31. When each of the second reference beams R21 to R26 is incident, the second signal beam S20 having data different from the previously recorded data is incident. Therefore, due to the angular multiplexing scheme, a plurality of overlapped optical information is recorded on the overlap recording region 1100a.

Next, in order to form other overlap recording regions 1100b and 1100c, the storage medium 50 is moved at the positions where the border parts 51 formed by the first reference beams R10 overlap with each other by using the storage medium moving member 70. When the storage medium 50 is moved by a predetermined distance at the positions where the other overlap recording regions 1100b and 1100c are to be formed, the second signal beam S20 having different information and the second reference beams R21 to R26 are incident to record the optical information. Here, the angular multiplexing scheme is the same as that of the previous recording.

The predetermined distance between the previous overlap recording region 1100a and the overlap recording region 1100b is maintained so that the border parts 52 of the second reference beams R21 to R26 uniformly overlap with each other and the overlap recording regions 1100a, 110b, and 1100c do not overlap with each other.

In such as manner, the storage medium 50 is moved to form the overlap recording regions 1100a to 1100c on the overall storage medium 50. Accordingly, as shown in FIG. 14B, the overlap recording regions 1100a to 1100c are separated from each other by a predetermined distance, and the border parts 52 where the incidence regions of the second reference beams R21 to R26 are formed overlap with the recording regions 1000a to 1000d.

Now, an optical information reproducing method of reproducing optical information from an optical information storage medium where the optical information is recorded by using the aforementioned recording method is described.

Figure 15:
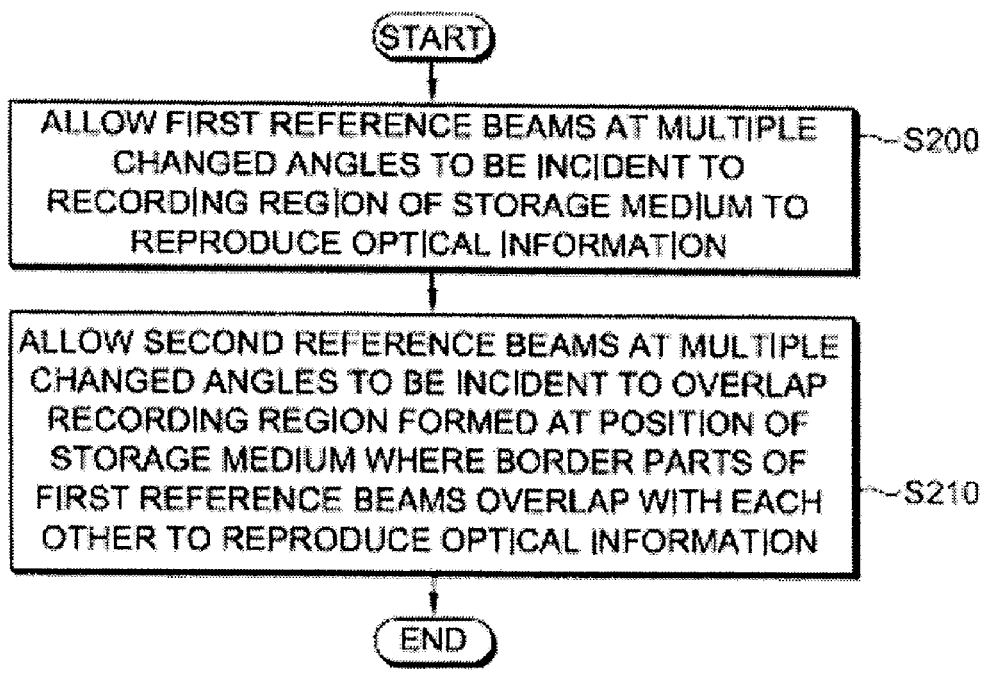
FIG. 15 is a flowchart for explaining an optical information reproducing method in the optical information processing method according to the second embodiment of the present invention.

FIG. 15 is a flowchart for explaining an optical information reproducing method in the optical information processing method according to the second embodiment of the present invention. As shown in FIG. 15, in the optical information reproducing method, only the reference beam R10 is incident to the storage medium 50, and readout beams reproduced from the recording regions 1001a to 1000d of the storage medium 50 are detected with an optical information detector 93 (S200). The first reference beam R10 is incident to each of the recording region 1000a to 1000d at a changed angle in a predetermined incidence angle range to reproduce the multiplexing-recorded data.

After the recording regions 1001a to 1000d are completely reproduced, the second reference beam R20 is incident to each of the overlap recording regions 1100a to 1100c at a changed angle in a predetermined incidence angle range. The readout beams reproduced from the overlap recording regions 1100a to 1100c are detected with the optical information detector 93 to reproduce data (S210).

The readout beams reproduced from the other regions during the reproduction of the recording regions 1000a to 100d and the overlap recording regions 1100a to 1100c are blocked by a filter 91, so that only the to-be-reproduced readout beams can be directed to the optical information detector 93.

With respect to the reproducing order of the recording regions 1000 and the overlap recording regions 1100, the recording regions 1000 may be firstly reproduced, and the overlap recording regions 1100 may be secondly reproduced. Alternatively, the overlap recording regions 1100 may be firstly reproduced, and the recording regions 1000 may be secondly reproduced. Alternatively, the recording regions 1000 are the overlap recording region 1100 which are sequentially located in the moving direction of the storage medium 50 may be sequentially reproduced. Other reproducing orders may be used to reproduce the recording regions and the overlap recording regions.

In the optical information processing method according to the embodiment of the present invention, the overlap recording regions 1100 are formed at the positions where the border parts of the first reference beams R11 to R16 overlap with each other. The overlap recording regions 1100 are located at the positions, so that it is possible to improve optical information recording and reproducing qualities.

Now, an experimental example using the optical information processing method according to the second embodiment of the present invention is described.

Figure 16:
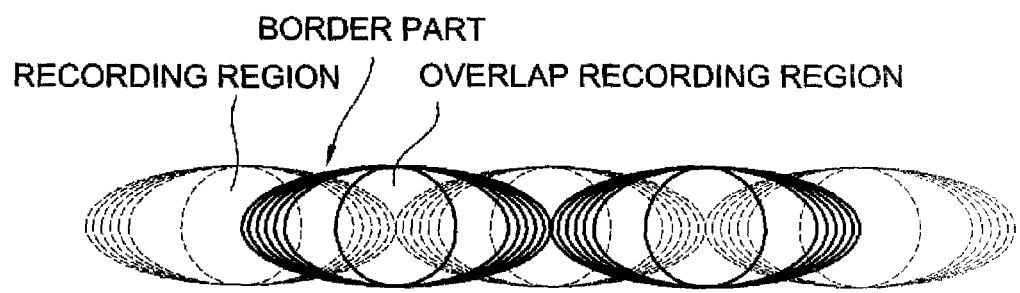
FIG. 16 is a view for explaining incidence regions of the reference beam according to a comparative embodiment of the second embodiment of the present invention.
Figure 17A:
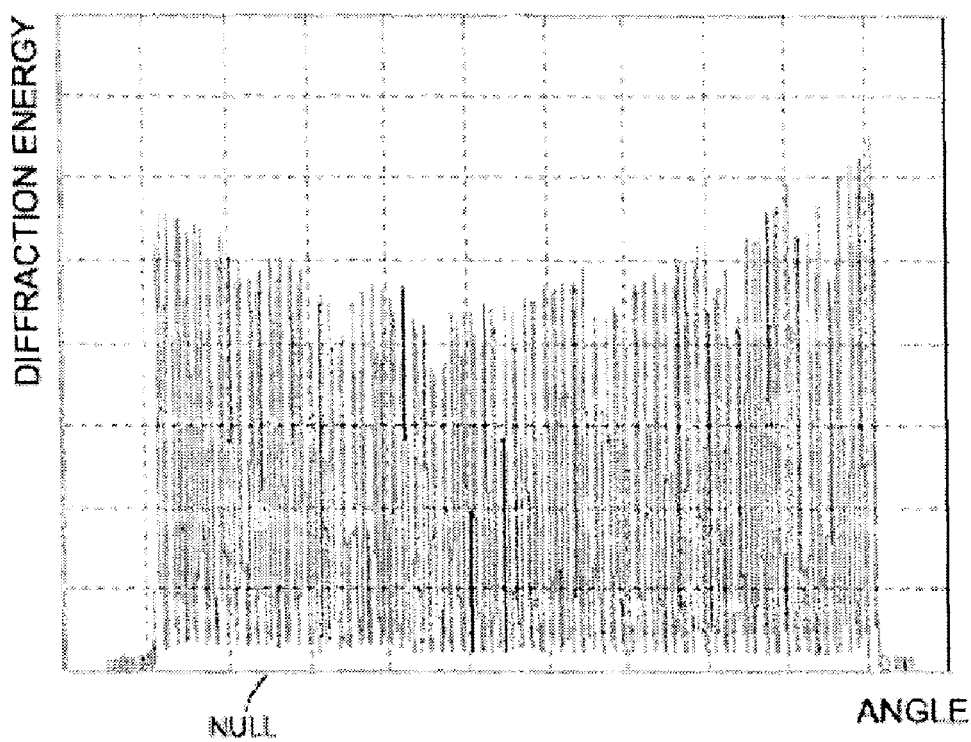
FIG. 17A is a graph showing diffraction energy measured from a recording region recorded by using an optical information recording method according to the comparative embodiment of the second embodiment of the present invention.
Figure 17B:
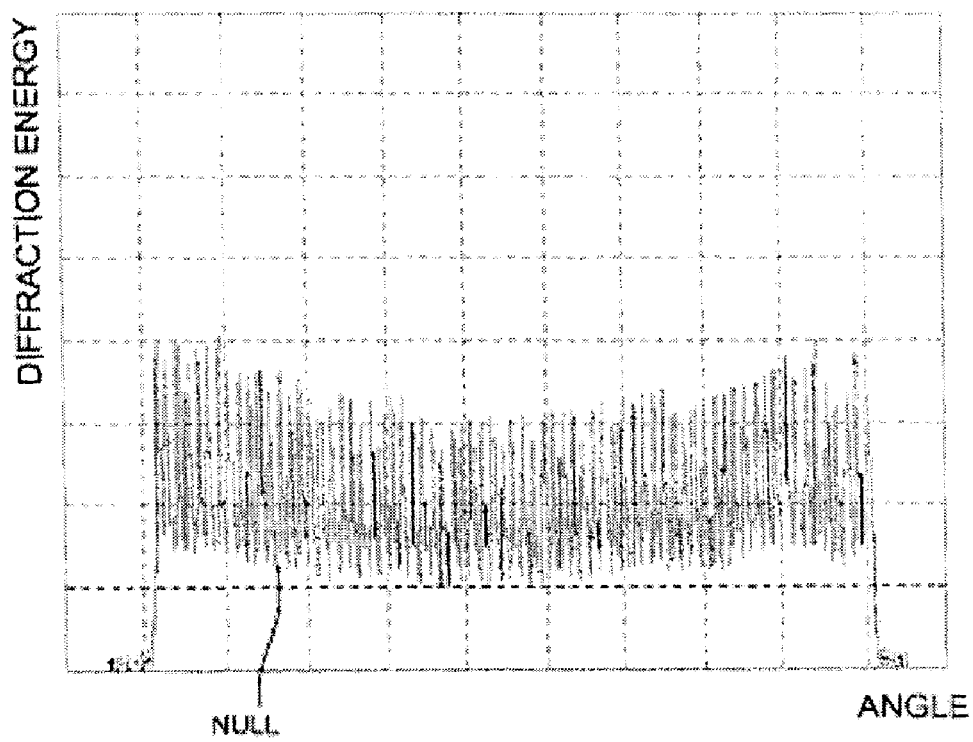
FIG. 17B is a graph showing diffraction energy measured from an overlap recording region recorded by using the optical information recording method according to the comparative embodiment of the second embodiment of the present invention.

FIG. 16 is a view for explaining incidence regions of the reference beam according to a comparative embodiment of the second embodiment of the present invention. FIG. 17A is a graph showing diffraction energy measured from a recording region recorded by using an optical information recording method according to the comparative embodiment of the second embodiment of the present invention. FIG. 17B is a graph showing diffraction energy measured from an overlap recording region recorded by using the optical information recording method according to the comparative embodiment of the second embodiment of the present invention.

As shown in FIG. 16, the incidence angle range is set to be in a range of 0° to 14.7°, and a step angle is set to 0.21°. Therefore, 71 holograms are overlapped and recorded in each of the recording regions or each of the overlap recording regions.

The first reference beams for forming the recording regions are incident so that the border parts thereof do not overlap with each other, and the incidence regions of the first reference beams are incident so as to be completely separated from each other. Namely, the border parts of the reference beams incident to the recording regions do not overlap with each other to be completely separated from each other, so that the outmost border parts are adjacent to each other. The second reference beams are also incident in the same manner. In addition, each of the overlap recording regions is formed in a region of which center is equal to the position at which the border parts of the first reference beams are adjacent to each other.

Now, diffraction energy measured from the recording regions and the overlap recording regions is described. Referring to FIGS. 17A and 17B, the height of 'null' for the diffraction energy of the recording region shown in FIG. 17A is low, but the height of 'null' for the diffraction energy of the overlap recording region shown in FIG. 17B is high.

Namely, the height of 'null' for the overlap recording region is larger than the height of 'null' for the recording region. The difference between the heights seems to be caused from a difference of refractive indexes between the overlap recording region and the recording region. It may be understood that, since the difference of the refractive indexes between the regions where the reference beams are incident causes crosstalk noise, the height of "null" is increased. In general, the diffraction energy of 'null' generates noise during the reproducing of the optical information. Therefore, it may be understood that the high energy of 'null' generating noise deteriorates a quality of readout data.

Next, a comparative experimental example using the optical information processing apparatus and method according to the second embodiment of the present invention is described.

Figure 18A:
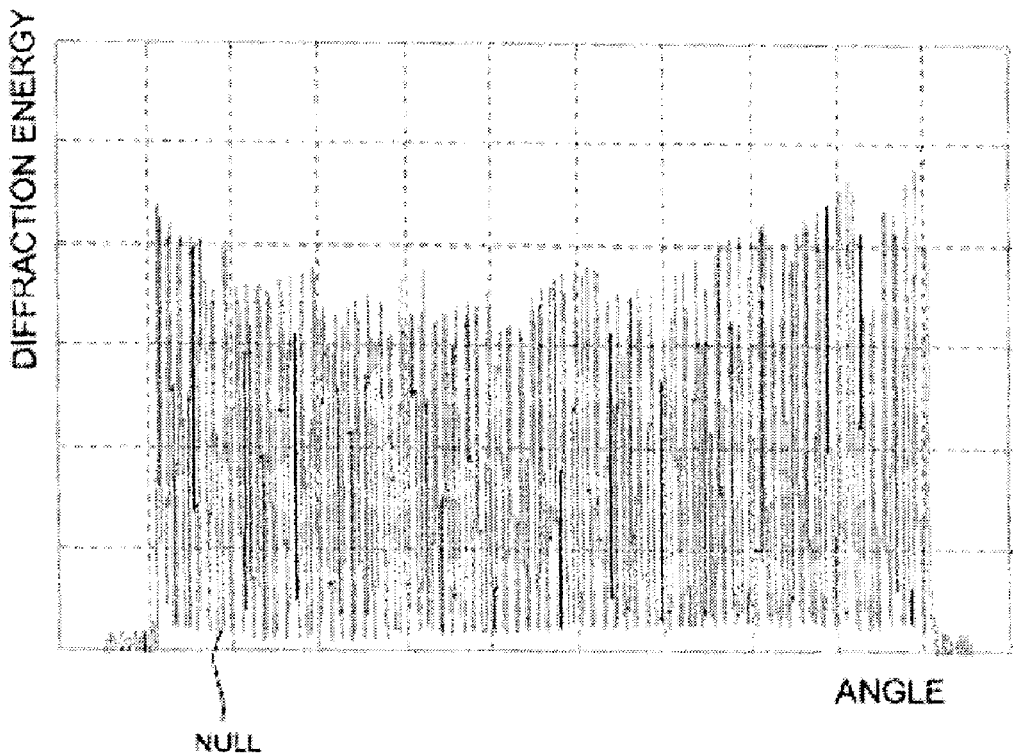
FIG. 18A is a graph showing diffraction energy measured from a recording region recorded by using the optical information recording method according to the second embodiment of the present invention.
Figure 18B:
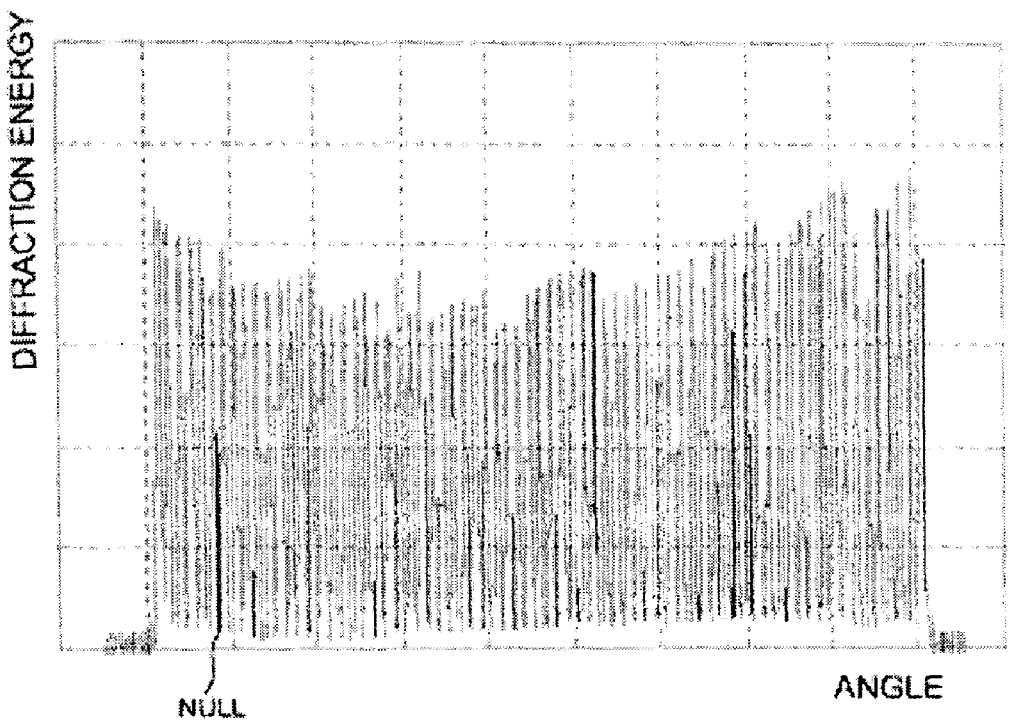
FIG. 18B is a graph showing diffraction energy measured from an overlap recording region recorded by using the optical information recording method according to the second embodiment of the present invention.

FIG. 18A is a graph showing diffraction energy measured from a recording region recorded by using the optical information recording method according to the second embodiment of the present invention. FIG. 18B is a graph showing diffraction energy measured from an overlap recording region recorded by using the optical information recording method according to the second embodiment of the present invention.

In the comparative experimental example of the second embodiment, for the angular multiplexing, the incidence angle range for the first reference beam R10 and the second reference beam R20 is set to be in a range of 0° to 14.7°, and a step angle is set to 0.21°. Therefore, 71 holograms are overlapped and recorded in each of the recording regions 100 or each of the partial overlap recording regions 1100. In addition, the recording regions 1000 and the overlap recording regions 1100 are formed in a state shown in FIG. 14B.

Now, diffraction efficiencies measured from the recording regions 1000 and the overlap recording regions 1100 are described. As shown in FIGS. 18A and 18B, 'null' for the diffraction energy is located at the relatively similar positions over all the recording regions 1000. Moreover, with respect to the overlap recording region 1100, the height of 'null' for the diffraction energy shown in FIG. 18B is smaller than the height of 'null' for the diffraction energy shown in FIG. 17B. In other words, it can be understood that the refractive indexes of the regions where the border parts of the first reference beams R10 overlap with each other becomes relatively uniform.

Accordingly to the experimental example, it can be understood that crosstalk noise in the overlap recording regions 1100 is reduced as the height of 'null' is lowered. Due to the reduction of crosstalk noise, a quality of recorded hologram is improved, and the data reproducing efficiency is also improved.

Various modifications of the optical information processing apparatus and method according to the aforementioned embodiments of the present invention can be made without departing from the sprit and scope of the present invention. For example, various light sources may be used, and selective angular multiplexing method for reference and signal beams may be used. A recording-dedicated apparatus or a reproducing-dedicated apparatus may be employed as some portions of construction of the embodiments of the present invention. In addition, an apparatus for processing optical information by rotating a storage medium or other optical information processing apparatuses may be used for an optical information recording or reproducing method according to the embodiments of the present invention.

In optical information processing apparatus and method according to the present invention, incidence angles of a reference beam or a signal beam incident to a recording region and a partial overlap recording region are adjusted for angular multiplexing in overlap recording regions, and incident angle ranges for the reference beam or the signal beam incident to the recording region and the partial overlap recording region are different from each other. Therefore, height of 'null' for diffraction energy of the recording regions can be lowered. In addition, incidence positions of the reference beams for the angular multiplexing are formed so that border parts of the reference beams overlap with each other, and overlap recording regions are formed at positions where the border parts overlap with each other. Therefore, the height of 'null' for diffraction energy of the overlap recording regions can be lowered. Accordingly, crosstalk noise during the recording and reproducing of the optical information can be reduced, so that it is possible to improve optical information recording and reproducing qualities and reproducing efficiency.

What is claimed is:

1. An optical information processing method comprising steps of:

forming a plurality of first recording regions by allowing a first signal beams and a first reference beam having multiple incidence angles in a first incidence angle range for one position to be incident to a plurality of positions of a storage medium, wherein border parts of incidence regions of the first reference beam corresponding to multiple incidence angles are formed in a hierarchical pattern, wherein the first recording regions are formed to be separated from each other;

forming each of a plurality of second recording regions between the first recording regions by allowing a second signal beams and a second reference beam having multiple incidence angles in a second incidence angle range for one position to be incident to a plurality of positions, so that the first recording regions and the second recording regions do not overlap with each other, wherein the second recording regions are formed to be separated from each other and partially overlap with the border parts of the first reference beam; and forming each of a plurality of partial an overlap recording regions by allowing a third signal beam and a third reference beam having multiple incidence angles in a third incidence angle range different from the first and second incidence angle range to be incident to a position so that first portion of the partial overlap recording region partially overlaps with the first recording region and second portion of the partial overlap recording region partially overlaps with the second recording region.

2. The optical information processing method according to claim 1, wherein the second recording regions are formed at the positions where the border parts of incidence regions of the first reference beams partially overlap with other border parts of incidence regions of the first reference beam incident to adjacent first recording regions.

3. The optical information processing method according to claim 1, wherein incidence regions of the first reference beam do not overlap with each other.

4. An optical information reproducing method comprising steps of:

allowing a first reference beam to be incident to first recording regions of a storage medium at multiple changed incidence angles in a first incidence angle range to reproduce optical information from the first recording regions so that border parts of incidence regions of the first reference beam overlap with second recording regions, wherein the first recording regions are formed to be separated from each other;

allowing the second reference beam to be incident to the second recording regions of the storage medium at multiple changed incidence angles in a second incidence angle range to reproduce optical information from the second recording regions, wherein the first recording regions and the second recording regions do not overlap with each other, wherein the second recording regions are formed to be separated from each other; and allowing a third reference beam to be incident to partial overlap recording regions of the storage medium at multiple changed incidence angles in a third incidence angle range different from the first and second incidence angle range to reproduce optical information from the partial overlap recording regions, wherein first portion of the partial overlap recording region partially overlaps with the first recording region and second portion of the partial overlap recording region partially overlaps with the second recording region.

5. The optical information reproducing method according to claim 4, wherein the second recording regions are formed at the positions where the border parts of incidence regions of the first reference beam partially overlap with other border parts of incidence regions of the first reference beam incident to adjacent first recording regions.

6. The optical information reproducing method according to claim 4, wherein incidence regions of the first reference beam do not overlap with each other.

* * * * *